US011162160B2

(12) United States Patent
Hattendorf et al.

(10) Patent No.: US 11,162,160 B2
(45) Date of Patent: Nov. 2, 2021

(54) USE OF A NICKEL-CHROMIUM-IRON-ALUMINUM ALLOY

(71) Applicant: VDM Metals International GmbH, Werdohl (DE)

(72) Inventors: Heike Hattendorf, Werdohl (DE); Christina Schmidt, Bochum (DE)

(73) Assignee: VDM Metals International GmbH, Werdohl (DE)

( * ) Notice: Subject to any disclaimer, the term of this patent is extended or adjusted under 35 U.S.C. 154(b) by 0 days.

(21) Appl. No.: 16/970,028

(22) PCT Filed: Mar. 14, 2019

(86) PCT No.: PCT/DE2019/100229
§ 371 (c)(1),
(2) Date: Aug. 14, 2020

(87) PCT Pub. No.: WO2019/185082
PCT Pub. Date: Oct. 3, 2019

(65) Prior Publication Data
US 2021/0115536 A1    Apr. 22, 2021

(30) Foreign Application Priority Data

Mar. 27, 2018  (DE) .................... 10 2018 107 248.1

(51) Int. Cl.
| | |
|---|---|
| C22C 19/05 | (2006.01) |
| B33Y 70/00 | (2020.01) |
| B33Y 80/00 | (2015.01) |
| B22F 1/00 | (2006.01) |
| C22F 1/10 | (2006.01) |

(52) U.S. Cl.
CPC .......... *C22C 19/053* (2013.01); *B22F 1/0048* (2013.01); *B33Y 70/00* (2014.12); *B33Y 80/00* (2014.12); *C22C 19/055* (2013.01); *C22F 1/10* (2013.01)

(58) Field of Classification Search
CPC ........ C22C 19/055; C22C 19/053; C22F 1/10
See application file for complete search history.

(56) References Cited

U.S. PATENT DOCUMENTS

| | | | |
|---|---|---|---|
| 4,882,125 A | 11/1989 | Smith et al. | |
| 5,980,821 A | 11/1999 | Brill | |
| 6,458,318 B1 | 10/2002 | Nishiyama et al. | |
| 6,623,869 B1 | 9/2003 | Nishiyama et al. | |
| 9,476,110 B2 | 10/2016 | Hattendorf et al. | |
| 9,657,373 B2 | 5/2017 | Hattendorf | |
| 2019/0055627 A1 | 2/2019 | Nagatomi et al. | |

FOREIGN PATENT DOCUMENTS

| | | |
|---|---|---|
| DE | 24 17 186 A1 | 10/1975 |
| DE | 600 04 737 T2 | 6/2004 |
| DE | 10 2009 010 026 A1 | 8/2010 |
| DE | 10 2012 002 514 A1 | 8/2012 |
| DE | 10 2012 011161 A1 | 12/2013 |
| DE | 10 2015 223 198 A1 | 5/2017 |
| EP | 0 508 058 A1 | 10/1992 |
| EP | 0 549 286 A1 | 6/1993 |
| EP | 1 505 166 A1 | 2/2005 |
| WO | 2013/182177 A1 | 12/2013 |
| WO | 2017/026519 A1 | 2/2017 |

OTHER PUBLICATIONS

International Search Report in PCT/DE2019/100229, dated May 15, 2019.
E. Slevolden, J.Z. Albertsen. U. Fink, "Tjeldbergodden Methanol Plant: Metal Dusting Investigations," Corrosion/2011, paper No. 11144 (Houston, TX: NACE 2011), pp. 1-15.
Ralf Bürgel, Handbuch der Hochtemperatur-Werkstofftechnik [Handbook of High-Temperature Materials Technology], Vieweg Verlag, Wiesbaden, 1998, pp. 358-369.
Grabke, H.J., Krajak, R., Mueller-Lorenz, E.M., and Strauss, S.: "Metal dusting of nickel-base alloys", Materials and Corrosion 47 (1996) pp. 495-504.
Hermse, C.G.M. and van Wortel, J.C.: "Metal dusting: relationship between alloy composition and degradation rate", Corrosion Engineering, Science and Technology 44 (2009), pp. 182-185.
Ralf Bürgel, Handbuch der Hochtemperatur-Werkstofftechnik, Vieweg Verlag, Wiesbaden, 1998, pp. 370-374.
English translation of the International Preliminary Report on Patentability and Written Opinion of the International Searching Authority in PCT/DE2019/100229, dated Mar. 14, 2019.
ISO 6892-1, Metallic materials—Tensile testing—Part 1: Method of test at room temperature, First edition 2009, 72 pages.
DIN EN ISO 6892-2, Metallic materials—Tensile testing—Part 2: Method of test at elevated temperature, 2011, 29 pages—(Relevance: same as DIN EN ISO 6892-1).

*Primary Examiner* — Jessee R Roe
(74) *Attorney, Agent, or Firm* — Collard & Roe, P.C.

(57) ABSTRACT

A nickel-chromium-aluminum alloy as powder is used for additive manufacturing, wherein the powder consists of spherical particles of a size of 5 to 250 pm, and wherein this alloy consists of (in % by weight) 24 to 33% chromium, 1.8 to 4.0% aluminum, 0.10 to 7.0% iron, 0.001 to 0.50% silicon, 0.005 to 2.0% manganese, 0.00 to 0.60% titanium, 0.0 to 0.05% magnesium and/or calcium respectively, 0.005 to 0.12% carbon, 0.001 to 0.050% nitrogen, 0.00001-0.100% oxygen, 0.001 to 0.030% phosphorus, a maximum of 0.010% sulfur, a maximum of 2.0% molybdenum, a maximum of 2.0% tungsten, the remainder nickel and the usual process-related impurities, wherein, with a pore size >1 pm, the powder has total inclusions of 0.0-4% of the pore surface area.

18 Claims, 4 Drawing Sheets

USE OF A NICKEL-CHROMIUM-IRON-ALUMINUM ALLOY

CROSS REFERENCE TO RELATED APPLICATIONS

This application is the National Stage of PCT/DE2019/100229 filed on Mar. 14, 2019, which claims priority under 35 U.S.C. § 119 of German Application No. 10 2018 107 248.1 filed on Mar. 27, 2018, the disclosure of which is incorporated by reference. The international application under PCT article 21(2) was not published in English.

BACKGROUND OF THE INVENTION

Field of the Invention

The invention relates to the use of a nickel-chromium-iron-aluminum wrought alloy with excellent high-temperature corrosion resistance, good creep strength and improved processability.

Description of the Related Art

Austenitic nickel-chromium-iron-aluminum alloys having different nickel, chromium and aluminum contents have long been used in furnace construction and in the chemical and petrochemical industry. For this service, good high-temperature corrosion resistance even in carburizing atmospheres is required, as is good high-temperature strength/creep strength.

In general, it must be pointed out that the high-temperature corrosion resistance of the alloys listed in Table 1 increases with increasing chromium content. All of these alloys form a chromium oxide layer (Cr2O3) with an underlying $Al_2O_3$ layer, which is more or less closed. Small additions of strongly oxygen-affine elements, such as, for example, Y or Ce, improve the oxidation resistance. In the course of service in the area of application for establishment of the protective layer, the chromium content is slowly consumed. The useful life of the material is therefore prolonged by a higher chromium content, since a higher content of the element chromium, which forms the protective layer, delays the time at which the Cr content goes below the critical limit and oxides other than Cr2O3 are formed that are, for example, iron-containing and nickel-containing oxides. A further increase of the high-temperature corrosion resistance can be achieved by additions of aluminum and silicon. Starting from a certain minimum content, these elements form a closed layer underneath the chromium oxide layer and in this way reduce the consumption of chromium.

In carburizing atmospheres (CO, $H_2$, $CH_4$, $CO_2$, $H_2O$ mixtures), carbon is able to penetrate into the material, and so formation of internal carbides may occur. These lead to a loss of notch impact strength. Also, the melting point may drop to very low values (as low as 350° C.) and transformation processes due to chromium depletion of the matrix may occur.

A high resistance to carburization is reached by materials with low solubility for carbon and low diffusion rate of the carbon. Nickel alloys are therefore more resistant in general to carburization than iron-base alloys, since both the diffusion of carbon and the solubility of carbon in nickel are smaller than in iron. An increase of the chromium content causes a higher carburization resistance due to formation of a protective chromium layer, unless the oxygen partial pressure in the gas is not sufficient for formation of this protective chromium oxide layer. At very low oxygen partial pressures, materials may be used that form a layer of silicon oxide or of the even more stable aluminum oxide, both of which are still able to form protective oxide layers at much lower oxygen contents.

In the case that the carbon activity is greater than 1, nickel-base, iron-base or cobalt-base alloys may undergo "metal dusting". In contact with the supersaturated gas, the alloys may incorporate large quantities of carbon. The segregation processes occurring in the alloy supersaturated with carbon lead to material destruction. In the process, the alloy decomposes to a mixture of metal particles, graphite, carbides and/or oxides. This type of material destruction takes place in the temperature range of 500° C. to 750° C.

Typical conditions for the occurrence of metal dusting are strongly carburizing CO, $H_2$ or $CH_4$ gas mixtures, such as occur in ammonia synthesis, in methanol plants, in metallurgical processes and even in hardening-shop furnaces.

The resistance to metal dusting tends to increase with increasing nickel content of the alloy (Grabke, H. J., Krajak, R., Müller-Lorenz, E. M., Strauß, S.: Materials and Corrosion 47 (1996), p. 495), but even nickel alloys are not resistant to metal dusting.

Figure 1:
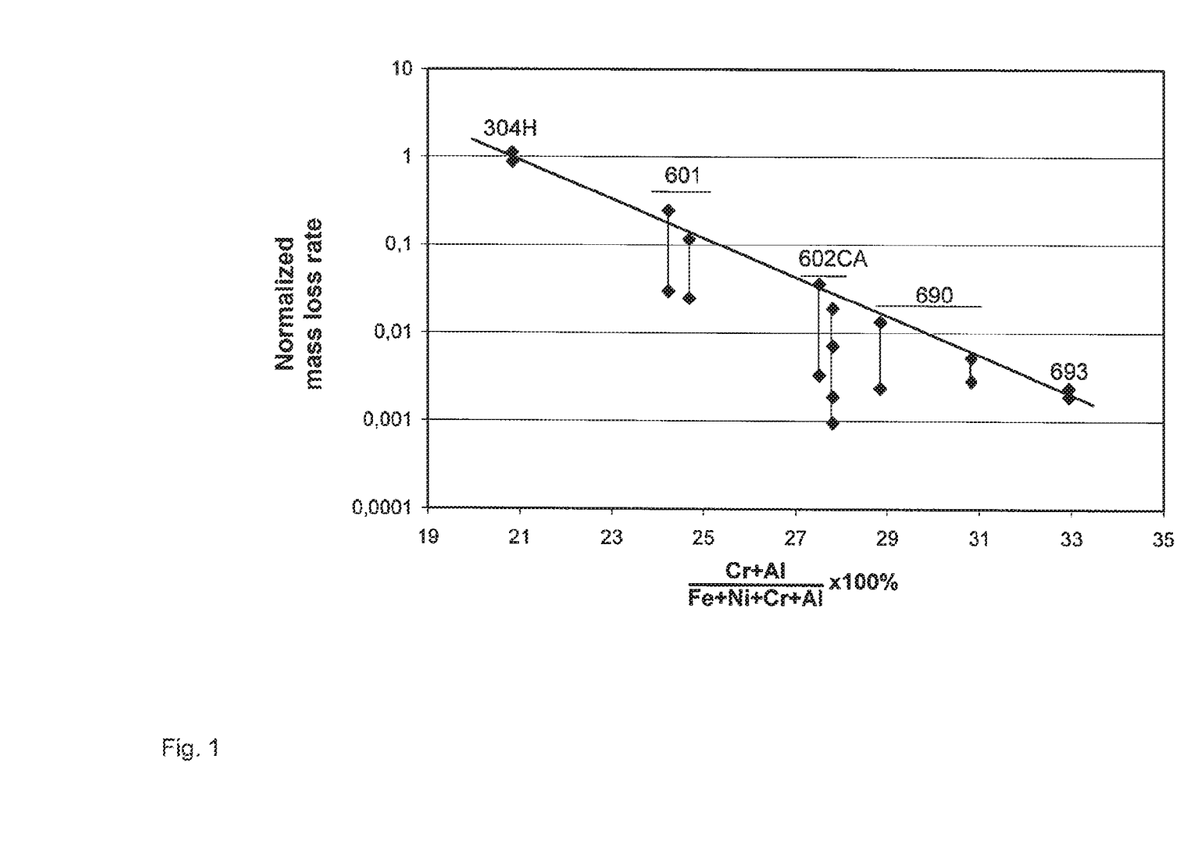
FIG. 1 Metal loss due to metal dusting as a function of the aluminum and chromium content in a strongly carburizing gas containing 37% CO, 9% $H_2O$, 7% $CO_2$, 46% $H_2$, which has $a_c$=163 and $p(O_2)$=2.5·10$^{-27}$. (from (Hermse, C. G. M. and van Wortei, J. C.: Metal dusting: relationship between alloy composition and degradation rate. Corrosion Engineering, Science and Technology 44 (2009), p. 182-185)

The chromium and aluminum content (see FIG. 1) have a distinct influence on the corrosion resistance under metal dusting conditions. Nickel alloys with low chromium content (such as the alloy designated Alloy 600, see Table 1) exhibit relatively high corrosion rates under metal dusting conditions. The nickel alloy designated Alloy 602 CA (N06025) with a chromium content of 25% and an aluminum content of 2.3% as well as Alloy 690 (N06690) with a chromium content of 30% (Hermse, C. G. M. and van Wortei, J. C.: Metal dusting: relationship between alloy composition and degradation rate. Corrosion Engineering, Science and Technology (2009), p. 182-185) are much more resistant. The resistance to metal dusting increases with the sum of Cr+Al.

The high-temperature strength and creep strength at the indicated temperature are improved by a high carbon content among other possibilities. However, even high contents of solid-solution-strengthening elements such as chromium, aluminum, silicon, molybdenum and tungsten improve the high-temperature strength. In the range of 500° C. to 900° C., additions of aluminum, titanium and/or niobium may improve the strength by precipitation of the ☐' phase and/or ☐'' phase.

Examples of these alloys according to the prior art are listed in Table 1.

By virtue of the high aluminum content of more than 1.8%, alloys such as Alloy 602 CA (N06025), Alloy 693 (N06693) or Alloy 603 (N06603) are known for their excellent corrosion resistance in comparison with Alloy 600 (N06600) or Alloy 601 (N06601). By virtue of their high chromium and/or aluminum contents, Alloy 602 CA (N06025), Alloy 693 (N06693), Alloy 603 (N06603) and Alloy 690 (N06690) exhibit an excellent carburization resistance and metal dusting resistance. At the same time, by virtue of the high carbon content or aluminum content, alloys such as Alloy 602 CA (N06025), Alloy 693 (N06693) or Alloy 603 (N06603) exhibit an excellent high-temperature strength and creep strength in the temperature range in which metal dusting occurs. Alloy 602 CA (N06025) and Alloy 603 (N06603) still have an excellent high-temperature strength and creep strength even at temperatures above 1000° C. However, due to the high aluminum contents, for example, the processability is impaired, and the impairment becomes greater the higher the aluminum content is (Alloy 693-N06693). The same is true to a greater degree for silicon, which forms low-melting intermetallic phases with nickel. In Alloy 602 CA (N06025) or Alloy 603 (N06603), especially the cold formability is limited by a high proportion of primary carbides.

U.S. Pat. No. 6,623,869B1 discloses a metallic material that consists of not more than 0.2% C, 0.01-4% Si, 0.05-2.0% Mn, not more than 0.04% P, not more than 0.015% S, 10-35% Cr, 30-78% Ni, 0.005-4.5% Al, 0.005-0.2% N, and one element or both of 0.015-3% Cu and 0.015-3% Co, with the rest iron up to 100%. Therein, the value of 40Si+Ni+5Al+40N+10(Cu+Co) is not less than 50, where the symbols of the elements mean the content of the corresponding elements. The material has an excellent corrosion resistance in an environment in which metal dusting is able to occur and it may therefore be used for furnace pipes, pipe systems, heat-exchanger tubes, etc. in petroleum refineries or petrochemical plants, and it is able to markedly improve the useful life and the safety of the plant.

EP 0 508 058 A1 discloses an austenitic nickel-chromium-iron alloy, consisting of (in weight %) C 0.12-0.3%, Cr 23-30%, Fe 8-11%, Al 1.8-2.4%, Y 0.01-0.15%, Ti 0.01-1.0%, Nb 0.01-1.0%, Zr 0.01-0.2%, Mg 0.001-0.015%, Ca 0.001-0.01%, N max. 0.03%, Si max. 0.5%, Mn max. 0.25%, P max. 0.02%, S max. 0.01%, Ni the rest, including unavoidable smelting-related impurities.

U.S. Pat. No. 4,882,125 B1 discloses a high-chromium-containing nickel alloy, which is characterized by an outstanding resistance to sulfidation and oxidation at temperatures above 1093° C., an outstanding corrosion resistance of more than 200 h at temperatures above 983° C. and a stress of 2000 PSI, a good tensile strength and good elongation, both at room temperature and elevated temperatures, consisting of (in weight %) 27-35% Cr, 2.5-5% Al, 2.5-6% Fe, 0.5-2.5% Nb, up to 0.1% C, respectively up to 1% Ti and Zr, up to 0.05% Ce, up to 0.05% Y, up to 1% Si, up to 1% Mn and Ni the rest.

EP 0 549 286 A1 discloses a high-temperature-resistant Ni—Cr alloy, containing 55-65% Ni, 19-25% Cr, 1-4.5% Al, 0.045-0.3% Y, 0.15-1% Ti, 0.005-0.5% C, 0.1-1.5% Si, 0-1% Mn and at least 0.005% in total of at least one of the elements of the group that includes Mg, Ca, Ce, <0.5% in total of Mg+Ca, <1% Ce, 0.0001-0.1% B, 0-0.5% Zr, 0.0001-0.2% N, 0-10% Co, the rest iron and impurities.

From DE 600 04 737 T2, a heat-resisting nickel-base alloy has become known, containing 0.1% C, 0.01-2% Si, 2% Mn, 0.005% S, 10-25% Cr, 2.1-<4.5% Al, 0.055% N, in total 0.001-1% of at least one of the elements B, Zr, Hf, wherein the said elements may be present in the following contents: B≤0.03%, Zr≤0.2%, Hf<0.8%, Mo 0.01-15%, W 0.01-9%, wherein a total content of Mo+W of 2.5-15% may be present, Ti 0-30, Mg 0-0.01%, Ca 0-0.01%, Fe 0-10%, Nb 0-1%, V 0-1%, Y 0-0.1%, La 0-0.1%, Ce 0-0.01%, Nd 0-0.1%, Cu 0-5%, Co 0-5%, the rest nickel. For Mo and W, the following formula must be satisfied:

$$2.5 \leq Mo+W \leq 15 \quad (1)$$

In DE 2417186, the use of a metal-carbide-containing iron-free austenitic sintered alloy is described, consisting (in wt %) of 15 to 40% metal carbide, 60 to 85% of a nickel alloy, with 0.5 to 3.5% molybdenum, 0.5 bis 2.5% aluminum, 13.5 to 33.0% chromium, the rest nickel, as material for and after chip-removing machining of articles that can be aged to higher hardness and wear resistance by an aging treatment, which must be corrosion-resistant to aqueous media with high chloride concentration.

In EP 1505166 A1, a cutting element is described, consisting of a Ni—Cr alloy containing 32 to 44 mass % Cr, 2.3 to 6 mass % Al, the rest Ni, impurities, and additional trace elements, which in this connection has a Rockwell C hardness of ≥52.

SUMMARY OF THE INVENTION

The task underlying the invention consists in designing the use of a nickel alloy that has a sufficiently high chromium and aluminum content that an excellent corrosion resistance is assured in highly corrosive conditions, such as, for example, an excellent metal dusting resistance, but at the same time it has
  a good phase stability
  a good processability
  a good corrosion resistance in air similar to that of Alloy 602 CA (N06025)
  a good high-temperature strength/creep strength This task is accomplished by the use of a nickel-chromium-aluminum alloy as powder for the additive fabrication, wherein the powder consists of spherical particles having a size of 5 to 250 µm, and wherein this alloy consists of (in wt %) 24 to 33% chromium, 1.8 to 4.0% aluminum, 0.10 to 7.0% iron, 0.001 to 0.50% silicon, 0.005 to 2.0% manganese, 0.00 to 0.60% titanium, respectively 0.0 to 0.05% magnesium and/or calcium, 0.005 to 0.12% carbon, 0.001 to 0.050% nitrogen, 0.00001-0.100% oxygen, 0.001 to 0.030% phosphorus, max. 0.010% sulfur, max. 2.0% molybdenum, max. 2.0% tungsten, the rest nickel and the usual process-related impurities, wherein the powder has total inclusions of 0.0-4% pore area for a pore size >1 µm.

Advantageous further developments of the subject matter of the invention can be inferred from the associated dependent claims.

The range of values for the particle size lies between 5 and 250 µm, wherein preferred ranges lie between 5 and 150 µm or 10 and 150 µm.

The powder has gas inclusions of 0.0 to 4% pore area (pores >1 µm) in relationship to the total area of evaluated objects, wherein preferred ranges are:
  0.0 to 2%
  0.0 to 0.5%
  0.0 to 0.2%
  0.0 to 0.1%
  0.0 to 0.05%

The powder has a bulk density of 2 up to the density of the alloy, which is approximately 8 g/cm³, wherein preferred ranges may have the following values:
  4-5 g/cm³
  2-8 g/cm³
  2-7 g/cm³
  3-6 g/cm³

The quantity of the gas inclusions of the powder permits a low residual porosity of the manufactured parts.

The range of values for the element chromium lies between 24 and 33%, wherein preferred ranges may be adjusted as follows:
  24 to <32%
  25 to <32%
  26 to <32%
  27 to <32%
  28 to <32%
  29 to <32%
  28 to 31%

28 to 30%
29 to 31%

The aluminum content lies between 1.8 and 4.0%, wherein here also, depending on the area of service of the alloy, preferred aluminum contents may be adjusted as follows:
1.8 to 3.2%
2.0 to 3.2%
2.0 to <3.0%
2.0 to 2.8%
2.2 to 2.8%
2.2 to 2.6%

The iron content lies between 0.1 and 7.0%, wherein, depending on the area of application, preferred contents may be adjusted within the following ranges of values:
0.1-4.0%
0.1-3.0%
0.1-<2.5%
0.1-2.0%
0.1-1.0%

The silicon content lies between 0.001 and 0.50%. Preferably, Si may be adjusted within the following range of values in the alloy:
0.001-0.20%
0.001-<0.10%
0.001-<0.05%

The same is true for the element manganese, which may have a content of 0.005 to 2.0% in the alloy. Alternatively, the following range of values is also conceivable:
0.005-0.50%
0.005-0.20%
0.005-0.10%
0.005-<0.05%

The titanium content lies between 0.0 and 0.60%. Preferably, Ti may be adjusted within the following range of values in the alloy:
0.001-0.60%
0.001-0.50%
0.001-0.30%
0.01-0.30%
0.01-0.25%

Magnesium and/or calcium also is present in contents of 0.00 to 0.05%. Preferably, the option exists of adjusting these elements as follows in the alloy:
>0.00-0.03%
>0.00-0.02%
>0.00-0.02%

The alloy contains 0.005 to 0.12% carbon. Preferably, this may be adjusted within the following range of values in the alloy:
0.01-0.10%
0.02-0.10%
0.03-0.10%

This is the case in the same way for the element nitrogen, which is present in contents between 0.0005 and 0.05%. Preferred contents may be indicated as follows:
0.001-0.04%

Furthermore, the alloy contains phosphorus in contents between 0.001 and 0.030%. Preferred contents may be indicated as follows:
0.001-0.020%

Furthermore, the alloy contains oxygen in contents between 0.00001 and 0.100%. Preferred contents may be indicated as follows:
0.00001-0.1
0.00002-0.1
0.00005-0.1
0.00008-0.1
0.0001-0.1
0.0002-0.1
0.0005-0.1
0.0008-0.1
0.001-0.1
0.002-0.1
0.005-0.1
0.008-0.1
0.010-0.1
0.00001-0.10
0.00001-0.08
0.00001-0.05
0.00001-0.03
0.00001-0.02

The element sulfur is indicated as follows in the alloy:
Sulfur max. 0.010%

Molybdenum and tungsten are present individually or in combination in the alloy with a content of respectively at most 2.0%. Preferred contents may be indicated as follows:
Mo max. 1.0%
W max. 1.0%
Mo max.<1.0%
W max.<1.0%
Mo max.<0.50%
W max.<0.50%
Mo max.<0.05%
W max.<0.05%

For highly corrosive conditions, but especially for a good metal dusting resistance, it is advantageous if the following relationship between Cr and Al is fulfilled:

$$Cr+Al \geq 28 \quad (2a)$$

wherein Cr and Al are the concentrations of the elements in question in mass %. Preferred ranges may be adjusted with:

$$Cr+Al \geq 29 \quad (2b)$$

$$Cr+Al \geq 30 \quad (2c)$$

$$Cr+Al \geq 31 \quad (2d)$$

Beyond this, the following relationship must be fulfilled in order that adequate phase stability is assured:

$$Fp \leq 39.9 \text{ with} \quad (3a)$$

$$Fp = Cr + 0.272*Fe + 2.36*Al + 2.22*Si + 2.48*Ti + 0.374*Mo + 0.538*W - 11.8*C \quad (4a)$$

wherein Cr, Fe, Al, Si, Ti, Mo, W and C are the concentrations of the elements in question in mass %.

Preferred ranges may be adjusted with:

$$Fp \leq 38.4 \quad (3b)$$

$$Fp \leq 36.6 \quad (3c)$$

Optionally, the element yttrium may be adjusted in contents of 0.0 to 0.20% in the alloy. Preferably, Y may be adjusted within the following range of values in the alloy:
0.0-0.15%
0.0-0.10%
0.0-<0.10%
>0.0-0.08%
0.001-<0.045%

Optionally, the element lanthanum may be adjusted in contents of 0.0 to 0.20% in the alloy. Preferably, La may be adjusted within the following range of values in the alloy:
0.0-0.15%
0.0-0.10%

0.0-<0.10%
>0.0-0.08%
0.001-0.04%

Optionally, the element Ce may be adjusted in contents of 0.0 to 0.20% in the alloy. Preferably, Ce may be adjusted within the following range of values in the alloy:
0.0-0.15%
0.0-0.10%
0.0-<0.10%
>0.0-0.08%
0.001-0.04%

Optionally, cerium mixed metal may also be used in contents of 0.0 to 0.20% during simultaneous addition of Ce and La. Preferably, cerium mixed metal may be adjusted within the following range of values in the alloy:
0.0-0.15%
0.0-0.10%
0.0-<0.10%
>0.0-0.08%
0.001-0.04%

Optionally, the element Nb may be adjusted in contents of 0.0 to 1.10% in the alloy. Preferably, Nb may be adjusted within the following range of values in the alloy:
0.001-<1.10%
0.001-<1.0%
0.001-<0.70%
0.001-<0.50%
0.001-0.30%
0.01-0.3%

If Nb is contained in the alloy, the formula 4a must be supplemented as follows with a term containing Nb:

$$F_p = Cr + 0.272*Fe + 2.36*Al + 2.22*Si + 2.48*Ti + 1.26*Nb + 0.374*Mo + 0.538*W - 11.8*C \quad (4b)$$

wherein Cr, Fe, Al, Si, Ti, Nb, Mo, W and C are the concentrations of the elements in question in mass %.

Optionally, the zirconium content may lie between 0.00 and 0.20%. Preferably, Zr may be adjusted within the following range of values in the alloy:
0.0-0.15%
>0.0-<0.10%
0.001-0.07%
0.001-0.04%

Optionally, the element hafnium may be adjusted in contents of 0.0 to 0.20% in the alloy. Preferably, Hf may be adjusted within the following range of values in the alloy:
0.0-0.15%
>0.0-<0.10%
0.001-0.07%
0.001-0.04%

Optionally, 0.001 to 0.60% tantalum may also be contained in the alloy.

Preferred Ta contents may be indicated as follows:
0.01 to 0.50%
0.01 to 0.40%
0.01 to 0.30%
0.01 to 0.20%
0.01 to 0.10%
0.01-<0.10%

Optionally, the element boron may be contained as follows in the alloy:
Boron 0.0001-0.008%

Preferred contents may be indicated as follows:
Boron 0.0005-0.008%
Boron 0.0005-0.004%

Furthermore, the alloy may contain 0.0 to 5.0% cobalt, which beyond this may be further limited as follows:
0.01 to 5.0%
0.01 to 2.0%
0.1 to 2.0%
0.01 to 0.5%
0.01-<0.1%

Furthermore, at most 0.5% Cu may be contained in the alloy.

Beyond this, the content of copper may be limited as follows:
Cu max.<0.20% or 0.20
Cu max.<0.10% or 0.10
Cu max.<0.05% or 0.05
Cu max.<0.015%

If Cu is contained in the alloy, the formula 4a must be supplemented as follows with a term containing Cu:

$$F_p = Cr + 0.272*Fe + 2.36*Al + 2.22*Si + 2.48*Ti + 0.477*Cu + 0.374*Mo + 0.538*W - 11.8*C \quad (4c)$$

wherein Cr, Fe, Al, Si, Ti, Cu, Mo, W and C are the concentrations of the elements in question in mass %.

If Nb and Cu are contained in the alloy, the formula 4a must be supplemented as follows with a term containing Nb and a term containing Cu:

$$F_p = Cr + 0.272*Fe + 2.36*Al + 2.22*Si + 2.48*Ti + 1.26*Nb + 0.477*Cu + 0.374*Mo + 0.538*W - 11.8*C \quad (4d)$$

wherein Cr, Fe, Al, Si, Ti, Nb, Cu, Mo, W and C are the concentrations of the elements in question in mass %.

Furthermore, at most 0.5% vanadium may be contained in the alloy.

Beyond this, the content of vanadium may be limited as follows:
V max.<0.10%

Finally, the elements lead, zinc and tin may be present as impurities in contents as follows:
Pb max. 0.002%
Zn max. 0.002%
Sn max. 0.002%

Furthermore, optionally the following relationship may be fulfilled, which describes a particularly good processability:

$$F_a \leq 60 \text{ with} \quad (5a)$$

$$F_a = Cr + 20.4*Ti + 201*C \quad (6a)$$

wherein Cr, Ti and Al are the concentrations of the elements in question in mass %.

Preferred ranges may be adjusted with:

$$F_a \leq 54 \quad (5b)$$

If Nb is contained in the alloy, the formula 6a must be supplemented as follows with a term containing Nb:

$$F_a = Cr + 6.15*Nb + 20.4*Ti + 201*C \quad (6b)$$

wherein Cr, Nb, Ti and C are the concentrations of the elements in question in mass %.

Furthermore, optionally the following relationship may be fulfilled, which describes a particularly good high-temperature strength and creep strength:

$$F_k \geq 45 \text{ with} \quad (7a)$$

$$F_k = Cr + 19*Ti + 10.2*Al + 12.5*Si + 98*C \quad (8a)$$

wherein Cr, Ti, Al, Si and C are the concentrations of the elements in question in mass %.

Preferred ranges may be adjusted with:

$$F_k \geq 49 \quad (7b)$$

$$F_k \geq 53 \quad (7c)$$

If Nb and/or B is contained in the alloy, the formula 8a must be supplemented as follows with a term containing Nb and/or B:

$$Fk = Cr + 19*Ti + 34.3*Nb + 10.2*Al + 12.5*Si + 98*C + 2245*B \quad (8b)$$

wherein Cr, Ti, Nb, Al, Si, C and B are the concentrations of the elements in question in mass %.

The powder according to the invention is preferably produced in a vacuum inert gas atomization system (VIGA). In this system, the alloy is melted in a vacuum induction melting furnace (VIM), directed into a casting gate that leads to a gas nozzle, in which the molten metal is atomized to metal particles with inert gas under high pressure of 5 to 100 bar. The melt is heated in the melting crucible to 5 to 400° C. above the melting point. The metal flow rate during atomization amounts to 0.5 to 80 kg/min and the gas flow rate is 2 to 150 m$^3$/min. Due to the rapid cooling, the metal particles solidify in the form of balls (spherical particles). The inert gas used for the atomization may contain 0.01 to 100% nitrogen if necessary. The gas phase is then separated from the powder in a cyclone, and then the powder is packaged.

The inert gas for powder manufacture may optionally be argon or a mixture of argon with 0.01 to <100% nitrogen. Possible limits of the nitrogen contents may be:
0.01 to 80%
0.01 to 50%
0.01 to 30%
0.01 to 20%
0.01 to 10%
0.01 to 5%
0.1 to 5%
0.5 to 10%
1 to 5%
2 to 3%

Alternatively, the inert gas may optionally be helium.

The inert gas may preferably have a purity of at least 99.996 vol. %. In particular, the nitrogen content should be from 0.0 to 10 ppmv, the oxygen content from 0.0 to 4 ppmv and have an H2O content of ≤5 ppmv.

In particular, the inert gas may preferably have a purity of at least 99.999 vol. %. In particular, the nitrogen content should be from 0.0 to 5 ppmv, the oxygen content from 0.0 to 2 ppmv and have an H$_2$O content of ≤3 ppmv.

The dew point in the system lies in the range of −10 to −120° C. It preferably lies in the range of −30 to −100° C.

The pressure during powder atomization may preferably be 10 to 80 bar.

The structural parts and components or layers on structural parts and components manufactured by means of additive fabrication are built up from layer thicknesses of 5 to 500 μm and directly after manufacture have a textured microstructure with grains elongated in structure direction and having a mean grain size of 2 μm to 1000 μm. The preferred range lies between 5 μm and 500 μm.

The structural parts and components or layers on structural parts and components manufactured by means of additive fabrication may optionally be subjected to a solution annealing in the temperature range of 700° C. to 1250° C. for 0.1 minutes to 70 hours, necessary under shield gas, such as argon or hydrogen, for example, followed by cooling in air, in the agitated annealing atmosphere or in the water bath. Thereafter the surface may optionally be cleaned or machined by pickling, blasting, grinding, turning, peeling, milling. Optionally, such a machining may already take place partly or completely even before the annealing.

The structural parts and components or layers on structural parts and components manufactured by means of additive fabrication have after an annealing a mean grain size of 2 μm to 2000 μm. The preferred range lies between 20 μm and 500 μm.

The structural parts and components or layers on structural parts and components manufactured from the powder manufactured according to the invention by means of additive fabrication are intended to be used preferably in areas in which highly corrosive conditions prevail, such as strongly carburizing conditions, for example, such as the case of structural parts in the petrochemical industry, for example. Beyond this, it is also suitable for furnace construction.

Under additive fabrication, terms such as generative fabrication, rapid technology, rapid tooling, rapid prototyping or the like are also understood.

In general, the following are distinguished here:
3D printing with powders,
Selective laser sintering and
Selective laser melting
Laser deposit welding
Selective electron beam welding.

Tests Performed:

The phases occurring in equilibrium were calculated for the various alloy variants with the JMatPro program of Thermotech. The TTN17 database for nickel-base alloys of Thermotech was used as the database for the calculations.

The formability is determined in a tension test according to DIN EN ISO 6892-1 at room temperature. In the process, the offset yield strength $R_{p0.2}$, the tensile strength $R_m$ and the elongation to break A are determined. The elongation A is determined on the broken specimen from the elongation of the original gauge length Lo:

$$A = (Lu - Lo)/Lo \, 100\% = \Delta L/Lo \, 100\%$$

Where Lu=measured length after the break.

Depending on gauge length, the elongation to break is provided with indices:

For example, for $A_5$ the gauge length Lo=5·do, where do=starting diameter of a round specimen.

The tests were performed on round specimens with a diameter of 6 mm in the measurement region and a gauge length Lo of 30 mm. The sampling took place in a manner transverse relative to the direction of forming of the semi-finished product. The forming speed was $6.7 \cdot 10^{-4}$ sec$^{-1}$ (4%/min) for $R_{p0.2}$ and $6.7 \cdot 10^{-3}$ sec$^{-1}$ (40%/min) for $R_m$.

The magnitude of the elongation A in the tension test at room temperature may be taken as a measure of the deformability. A readily processable material should have an elongation of at least 50%.

The high-temperature strength is determined in a hot tension test according to DIN EN ISO 6892-2. In the process, the offset yield strength $R_{p0.2}$, the tensile strength $R_m$ and the elongation to break A are determined by analogy with the tension test at room temperature (DIN EN ISO 6892-1).

The tests were performed on round specimens with a diameter of 6 mm in the measurement region and an initial gauge length Lo of 30 mm. The sampling took place in a manner transverse relative to the direction of forming of the semifinished product. The forming speed was $8.33 \cdot 10^{-5}$ sec$^{-1}$ (0.5%/min) for $R_{p0.2}$ and $8.33 \cdot 10^{-4}$ sec$^{-1}$ (5%/min) for $R_m$.

The specimen is mounted at room temperature in a tension-testing machine and heated without loading by a tensile force to the desired temperature. After attainment of the test temperature, the specimen is held without loading for one hour (600° C.) or for two hours (700° C. to 1100° C.) for a temperature equilibration. Then the specimen is so loaded with a tensile force that the desired elongation rates are maintained and the test begins.

The creep strength of a material is improved with increasing high-temperature strength. Therefore the high-temperature strength is also used for assessment of the creep strength of the various materials.

The corrosion resistance at higher temperatures was determined in an oxidation test at 1000° C. in air, wherein the test was interrupted every 96 hours and the changes in mass of the specimens due to oxidation was determined. During the test, the specimens were placed in ceramic crucibles, so that any oxide spalled off was collected and the mass of the spalled oxide may be determined by weighing the crucible containing the oxides. The sum of the mass of the spalled oxide and of the change in mass of the specimens is the gross change in mass of the specimen. The specific change in mass is the change in mass relative to the surface area of the specimens. These are denoted in the following as $m_{net}$ for the specific net change in mass, $m_{gross}$ for the specific gross change in mass, $m_{spall}$ for the specific change in mass of the spalled oxides. The tests were performed on specimens having approximately 5 mm thickness. For each batch, 3 specimens were aged; the indicated values are the mean values of these 3 specimens.

Description of the Properties

The alloy according to the invention is intended to have, besides an excellent corrosion resistance under highly corrosive conditions, in this case, for example, an excellent metal dusting resistance, but at the same time the following properties:

a good phase stability a good processability a good corrosion resistance in air similar to that of Alloy 602CA (N06025)

a good high-temperature strength/creep strength

Phase Stability

Figure 2:
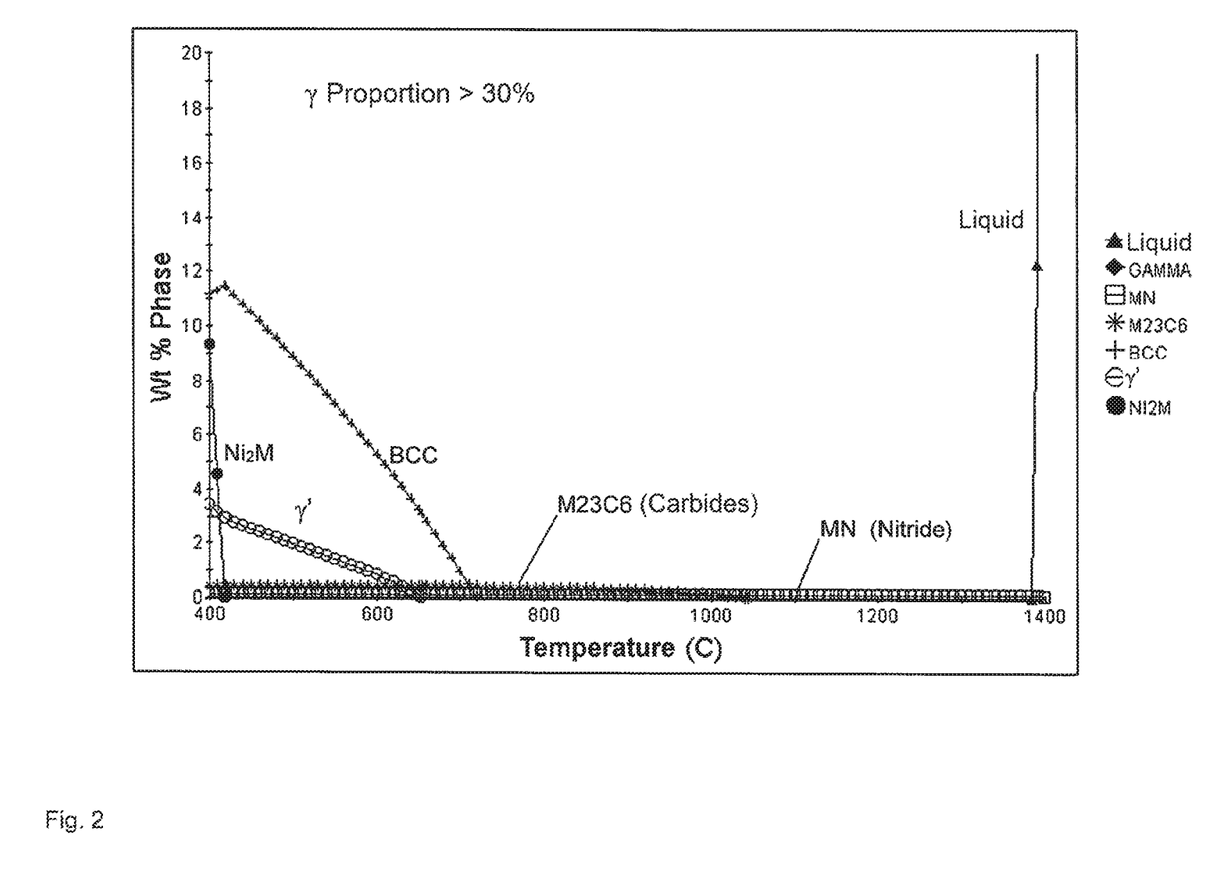
FIG. 2 Quantitative proportions of the phases in thermodynamic equilibrium in dependence on the temperature of alloy 690 (N06690) on the example of the typical batch 111389
Figure 3:
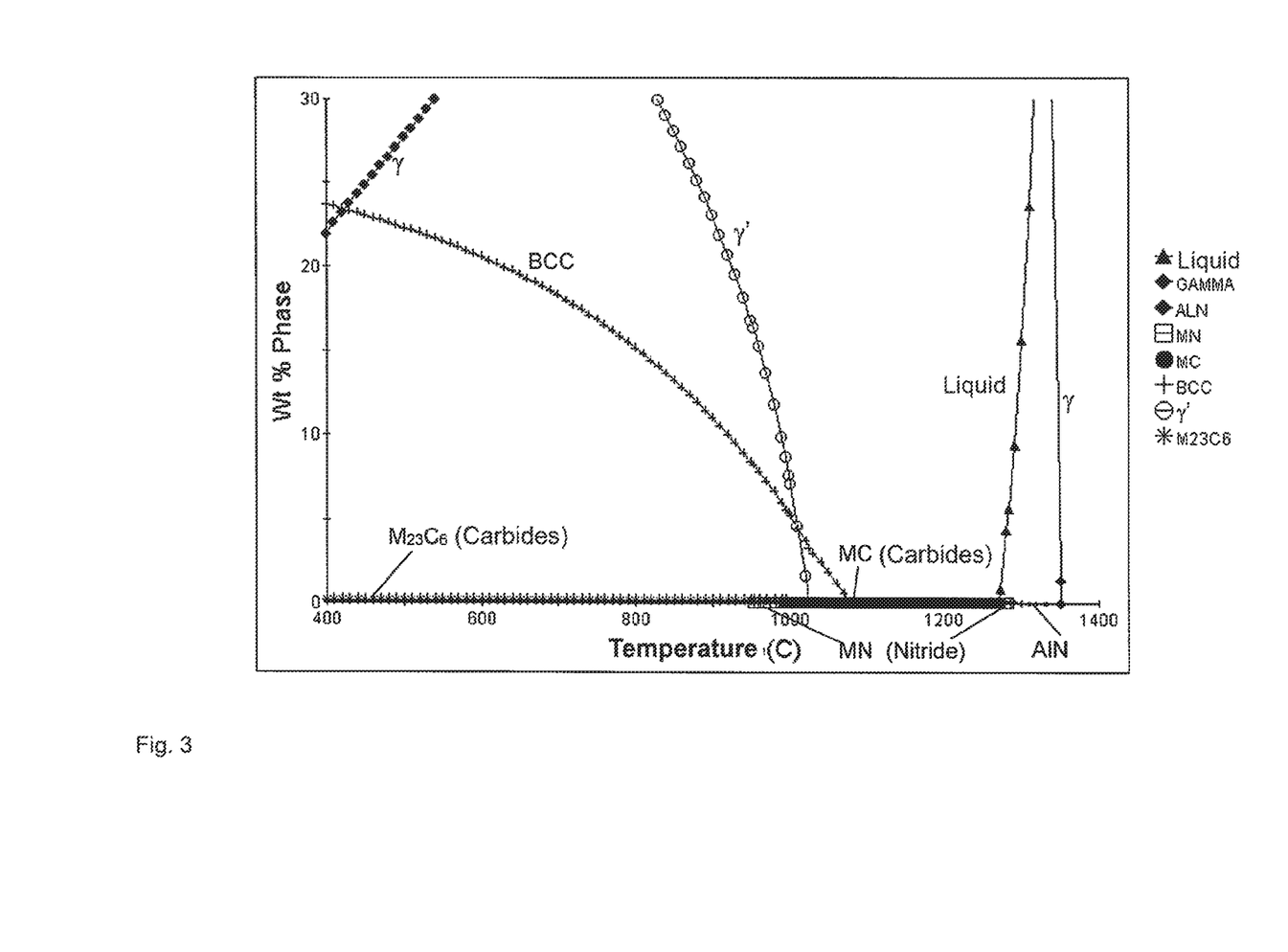
FIG. 3 Quantitative proportions of the phases in thermodynamic equilibrium in dependence on the temperature of alloy 693 (N06693) on the example of alloy 3 from Table 2
Figure 4:
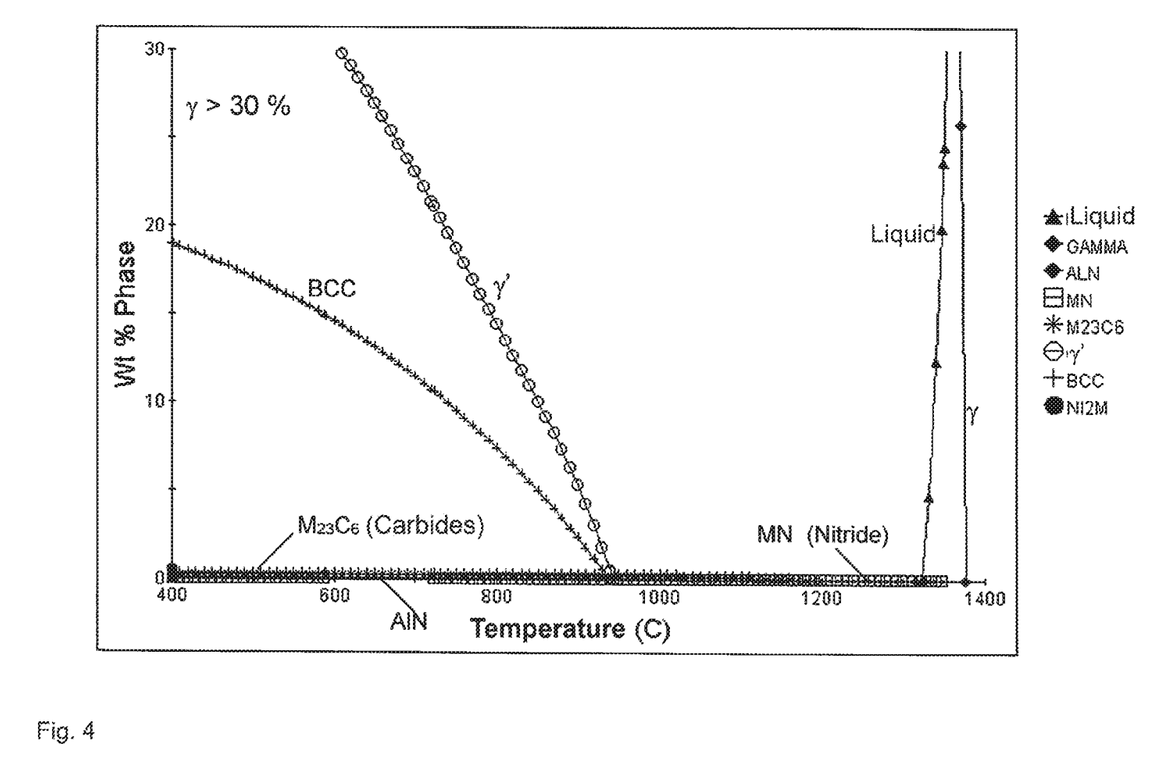
FIG. 4 Quantitative proportions of the phases in thermodynamic equilibrium in dependence on the temperature of alloy 693 (N06693) on the example of alloy 10 from Table 2

In the nickel-chromium-aluminum-iron system with additions of Ti and/or Nb, various embrittling TCP phases such as, for example, the Laves phases, sigma phases or the μ-phases or even the embrittlng η γ' phase or γ" phases may be formed, depending on alloy contents (see, for example, Ralf Bürgel, Handbuch der Hochtemperaturwerkstofftechnik [Handbook of High-Temperature Materials Technology], 3rd Edition, Vieweg Verlag, Wiesbaden, 2006, pp. 370-374). The calculation of the equilibrium-phase proportions in dependence on temperature of, for example, the batch 111389 for N06690 (see Table 2 for typical compositions) show theoretically the formation of α-chromium (BCC phase in FIG. 2) below 720° C. ($T_s\ f_{Bcc}$) in large quantitative proportions. However, this phase is formed only with difficulty, due to the fact that it is analytically very different from the parent material. If the temperature of formation $T_s\ E_{BCC}$ of this phase is very high, however, it is definitely able to occur, as is described, for example in "E. Slevolden, J. Z. Albertsen. U. Fink, "Tjeldbergodden Methanol Plant: Metal Dusting Investigations," Corrosion/2011, paper no. 11144 (Houston, Tex.: NACE 2011), p. 15" for a variant of Alloy 693 UNS 06693. FIG. 3 and FIG. 4 show the phase diagrams of the Alloy 693 variants (from U.S. Pat. No. 4,882,125 Table I) Alloy 3 and Alloy 10 from Table 2. This phase is brittle and leads to an undesirable embrittlement of the material. Alloy 3 has a temperature of formation $T_s\ E_{BCC}$ of 1079, Alloy 10 of 639. In "E. Slevolden, J. Z. Albertsen. U. Fink, "Tjeldbergodden Methanol Plant: Metal Dusting Investigations," Corrosion/2011, paper no. 11144 (Houston, Tex.: NACE 2011), p. 15", the exact analysis of the alloy at which α-chromium (BCC) appears is not described. However, it is to be assumed that, among the examples listed in Table 2 for Alloy 693, α-chromium (BCC phase) is able to form in the analyses which theoretically have the highest temperatures of formation $T_sE_{BCC}$ (such as, for example, Alloy 10). In a corrective analysis (with reduced temperature of formation $T_{s\ Bcc}$), α-chromium was then still observed only close to the surface in "E. Slevolden, J. Z. Albertsen. U. Fink, "Tjeldbergodden Methanol Plant: Metal Dusting Investigations," Corrosion/2011, paper no. 11144 (Houston, Tex.: NACE 2011), p. 15". In order to avoid the occurrence of such an embrittling phase, the temperature of formation $T_sE_{BCC}$ should, in the alloy according to the invention, be lower than or equal to 939° C.—the lowest temperature of formation $T_sE_{BCC}$ among the examples for Alloy 693 in Table 2 (from U.S. Pat. No. 4,882,125 Table 1).

This is the case in particular when the following formula is satisfied:

$$Fp \leq 39.9 \text{ with} \tag{3a}$$

$$Fp = Cr + 0.272*Fe + 2.36*Al + 2.22*Si + 2.48*Ti + 0.374*Mo + 0.538*W - 11.8*C \tag{4a}$$

wherein Cr, Al, Fe, Si, Ti, Nb, Cu, Mo, W and C are the concentrations of the elements in question in mass %. Table 2 containing the alloys according to the prior art shows that Fp is greater than 39.9 for Alloy 8, Alloy 3 and Alloy 2 and is exactly 39.9 for Alloy 10. For all other alloys with $T_s\ E_{BCC}$ lower than 939° C., Fp is ≤39.9.

Processability

As an example, the formability will be considered here for the processability.

An alloy may be hardened by several mechanisms, so that it has a high high-temperature strength and creep strength. Thus alloying with a different element results in a more or less large increase of the strength (solid-solution hardening), depending on element. An increase of the strength by fine particles or precipitates (particle hardening) is much more effective. This may be accomplished, for example, by the □' phase, which is formed during additions of Al and further elements such as, for example, Ti to a nickel alloy, or by carbides that are formed by addition of carbon to a chromium-containing nickel alloy (see, for example, Ralf Bürgel, Handbuch der Hochtemperaturwerkstofftechnik [Handbook of High-Temperature Materials Technology], 3rd Edition, Vieweg Verlag, Wiesbaden, 2006, pp. 358-369).

The increase of the content of the elements that form the □'-phase or of the C content indeed increases the high-temperature strength, but increasingly impairs the deformability, even in the solution-annealed state.

For a very readily formable material, elongations A5 in the tension test at room temperature are desired that are greater than or equal to 50%, but at least greater than or equal to 45%.

This is accomplished in particular when the following relationship is fulfilled between the carbide-forming elements Cr, Nb, Ti and C:

$$Fa \leq 60 \text{ with} \tag{5a}$$

$$Fa = Cr + 6.15*Nb + 20.4*Ti + 201*C \tag{6b}$$

wherein Cr, Nb, Ti and C are the concentrations of the elements in question in mass %.

High-Temperature Strength/Creep Strength

At the same time, the offset yield strength or the tensile strength at higher temperatures should reach at least the values of Alloy 601 (see Table 4):

$$600° \text{ C.: offset yield strength } R_{p0.2} > 150 \text{ MPa; tensile strength } R_m > 500 \text{ MPa} \quad (9a, 9b)$$

$$800° \text{ C.: offset yield strength } R_{p0.2} > 130 \text{ MPa; tensile strength } R_m > 135 \text{ MPa} \quad (9c, 9d)$$

It would be desirable for the offset yield strength or the tensile strength to lie in the range of Alloy 602 CA (see Table 4). At least 3 of the 4 following relationships should be fulfilled:

$$600° \text{ C.: offset yield strength } R_{p0.2} > 250 \text{ MPa; tensile strength } R_m > 570 \text{ MPa} \quad (10a, 10b)$$

$$800° \text{ C.: offset yield strength } R_{p0.2} > 180 \text{ MPa; tensile strength } R_m > 190 \text{ MPa} \quad (10c, 10d)$$

This is accomplished in particular when the following relationship is fulfilled between the primarily hardening elements:

$$Fk \geq 45 \text{ with} \quad (7a)$$

$$Fk = Cr + 19*Ti + 34.3*Nb + 10.2*Al + 12.5*Si + 98*C + 2245*B \quad (8b)$$

wherein Cr, Ti, Nb, Al, Si, C and B are the concentrations of the elements in question in mass %.

Corrosion Resistance:

The alloy according to the invention is intended to have a good corrosion resistance in air similar to that of Alloy 602CA (N06025).

EXAMPLES

Manufacture:

For observation of the properties of the structural parts and components manufactured from the powder, alloys melted on the laboratory scale in a vacuum furnace are used.

Tables 3a and 3b show the analyses of the batches melted on the laboratory scale together with some batches of Alloy 602CA (N06025), Alloy 690 (N06690), Alloy 601 (N06601) melted on the industrial scale according to the prior art and used for comparison. The batches according to the prior art are identified with a T and those according to the invention with an E. The batches melted on the laboratory scale are marked with an L, the batches melted on the industrial scale with a G.

The ingots of the alloys in Table 3a and b, melted on the laboratory scale in vacuum, were annealed between 900° C. and 1270° C. for 8 hours and hot-rolled to a final thickness of 13 mm and 6 mm by means of hot rolling and further intermediate annealings between 900° C. and 1270° C. for 0.1 to 1 hours. The sheets produced in this way were solution-annealed between 900° C. and 1270° C. for 1 hour. The specimens needed for the measurements were manufactured from these sheets.

For the alloys melted on the industrial scale, a sample was taken from the industrial-scale fabrication of a commercially fabricated sheet having appropriate thickness. The specimens needed for the measurements were manufactured from these sheets.

All alloy variants typically had a grain size of 70 to 300 μm.

For the exemplary batches in Table 3a and b, the following properties were compared:

Metal dusting resistance as an example of high corrosion resistance in a highly corrosive atmosphere Phase stability Formability on the basis of the tension test at room temperature The high-temperature strength/creep strength by means of hot tension tests The corrosion resistance by means of an oxidation test For the batches 2297 to 2308 and 250060 to 250149 melted on the laboratory scale, but in particular for the batches according to the invention marked with E (2301, 250129, 250132, 250133, 250 134, 250137, 240138, 250147, 250148), formula (2a) Al+Cr ≥28 is fulfilled. Thus they fulfill the requirement that was imposed on the metal dusting resistance.

For the chosen alloys according to the prior art in Table 2 and for all laboratory batches (Tables 3a and 3b), the phase diagrams were therefore calculated and the temperature of formation $T_{s\ BCC}$ was entered in Tables 2 and 3a. For the compositions in Tables 2 and 3a and b, the value for Fp was also calculated according to formula 4a. Fp is all the more greater the higher the temperature of formation $T_{s\ BCC}$ is. All examples of N06693 with a higher temperature of formation $T_s$ $E_{BCC}$ higher than that of Alloy 10 have an Fp>39.9. The requirement Fp≤39.9 (formula 3a) is therefore a good criterion for achieving an adequate phase stability for an alloy. All laboratory batches in Tables 3a and b fulfill the criterion Fp≤39.9.

Offset yield strength $R_{p0.2}$, the tensile strength $R_m$ and the elongation As for room temperature (RT) and for 600° C. are entered in Table 4, as is further the tensile strength $R_m$ for 800° C. Moreover, the values for Fa and Fk are entered.

In Table 4, the exemplary batches 156817 and 160483 of the alloy according to the prior art, Alloy 602 CA, have a relatively small elongation A5 at room temperature of 36 and 42% respectively, which lie below the requirements for a good formability. Fa is greater that 60 and thus above the range that characterizes a good workability. All alloys according to the invention (E) exhibit an elongation greater than 50%. Thus they fulfill the requirements. Fa is smaller than 60 for all alloys according to the invention. Thus they lie in the range of a good formability. The elongation is particularly high when Fa is relatively small.

The exemplary batch 156658 of the alloy according to the prior art, Alloy 601 in Table 4, is an example of the minimum requirements of offset yield strength and tensile strength at 600° C. and 800° C.; in contrast, the exemplary batches 156817 and 160483 of the alloy according to the prior art, Alloy 602 CA, are examples of very good values of offset yield strength and tensile strength at 600° C. and 800° C. Alloy 601 represents a material that exhibits the minimum requirements of high-temperature strength and creep strength that are described in relationships 9a to 9d, Alloy 602 CA a material that exhibits an outstanding high-temperature strength and creep strength that are described in relationships 10a to 10d. For both alloys, the value for Fk is much larger than 45 and for Alloy 602 CA it is additionally even much higher than the value of Alloy 601, which reflects the elevated strength values of Alloy 602 CA. The alloys according to the invention (E) all exhibit an offset yield strength and tensile strength at 600° C. and 800° C. in the range of or clearly above that of Alloy 601, and therefore have fulfilled the relationships 9a to 9d. They lie in the range of the values of Alloy 602 CA and also fulfill the desirable requirements, i.e. 3 of the 4 relationships 10a to 10d. Fk also is larger than 45 for all alloys according to the invention in the examples in Table 4, in fact even larger than 54 in most cases and thus in the range that is characterized by a good high-temperature strength and creep strength. Among the laboratory batches that are not according to the invention, batches 2297 and 2300 are an example that does not fulfill relationships 9a to 9d and also has an Fk smaller than 45.

Table 5 shows the specific changes in mass after an oxidation test at 1100° C. in air after 11 cycles of 96 hours, i.e. in total 1056 hours. In Table 5, the specific gross change in mass, the specific net change in mass and specific change in mass of the spalled oxides after 1056 hours are indicated. The exemplary batches of the alloys according to the prior art, Alloy 601 and Alloy 690, exhibited a much higher gross change in mass than Alloy 602 CA, wherein that of Alloy 601 is in turn much larger than that of Alloy 690. Both form a chromium oxide layer that grows more rapidly than an aluminum oxide layer. Alloy 601 still contains approximately 1.3% Al. This content is too small in order to already form an even only partly closed aluminum oxide layer, for which reason the aluminum in the interior of the metallic material is oxidized underneath the oxide layer (internal oxidation), which results in a greater increase in mass in comparison with Alloy 690. Alloy 602 CA contains approximately 2.3% aluminum. For this alloy, therefore, an at least partly closed aluminum oxide layer is able to form underneath the chromium oxide layer. This reduces the growth of the oxide layer markedly and thus also the specific increase in mass. All alloys according to the invention (E) contain at least 2% aluminum and therefore have a similarly small or smaller gross increase in mass than Alloy 602 CA. Also, all alloys according to the invention exhibit spalling in the range of the measurement accuracy, similarly to the exemplary batches of Alloy 602 CA, whereas Alloy 601 and Alloy 690 exhibit greater spalling.

The claimed limits for the use of the alloy "E" according to the invention as powder for the additive fabrication can therefore be justified in detail as follows:

A too small particle size below 5 μm impairs the flow behavior and is therefore to be avoided; a too large particle size above 250 μm impairs the behavior during additive fabrication.

A too low bulk density of 2 g/cm³ impairs the behavior during additive fabrication. The greatest possible bulk density of approximately 8 g/cm³ is imposed by the density of the alloy.

Too low Cr contents mean that the Cr concentration during use of the alloy in a corrosive atmosphere decreases very rapidly below the critical limit, and so a closed chromium oxide can no longer be formed. Therefore 24% Cr is the lower limit for chromium. Too high Cr contents worsen the phase stability of the alloy, especially at the high aluminum contents of ≥1.8%. Therefore 33% Cr is to be regarded as the upper limit.

The formation of an aluminum oxide layer underneath the chromium oxide layer reduces the oxidation rate. Below 1.8% Al, the aluminum oxide layer is too incomplete to develop its effect fully. Too high Al contents impair the processability of the alloy. Therefore an Al content of 4.0% forms the upper limit.

The costs for the alloy increase with the reduction of the iron content. Below 0.1%, the costs rise disproportionally, since special primary material must be used. For cost reasons, therefore, 0.1% Fe is to be regarded as the lower limit. With increase of the iron content, the phase stability is reduced (formation of embrittling phases), especially at high chromium and aluminum contents. Therefore 7% Fe is a practical upper limit in order to ensure the phase stability of the alloy according to the invention.

Si is needed for the manufacture of the alloy. A minimum content of 0.001% is therefore necessary. Too high contents in turn impair the processability and the phase stability, especially at high aluminum and chromium contents. The Si content is therefore restricted to 0.50%.

A minimum content of 0.005% Mn is necessary for improvement of the processability. Manganese is limited to 2.0%, since this element reduces the oxidation resistance.

Titanium increases the high-temperature stability. At 0.60% and above, the oxidation behavior may be impaired, which is why 0.60% is the maximum value.

Even very low Mg contents and/or Ca contents improve the processing by the binding of sulfur, whereby the occurrence of low-melting NiS eutectics is avoided. For Mg and Ca, therefore, a minimum content of 0.0002% is necessary. At too high contents, intermetallic Ni—Mg phases or Ni—Ca phases may occur, which again greatly worsen the processability. The Mg content and/or Ca content is therefore limited to at most 0.05%.

A minimum content of 0.005% C is necessary for a good creep strength. C is limited to at most 0.12%, since above such a content this element reduces the processability by the excessive formation of primary carbides.

A minimum content of 0.001% N is necessary, whereby the processability of the material is improved. N is limited to at most 0.05%, since this element reduces the processability by the formation of coarse carbonitrides.

The oxygen content must be smaller than or equal to 0.100%, in order to ensure the manufacturability and usability of the alloy. A too low oxygen content increases the costs. The oxygen content is therefore ≥0.0001%.

The content of phosphorus should be smaller than or equal to 0.030%, since this surface-active element impairs the oxidation resistance. A too low P content increases the costs. The P content is therefore ≥0.001%.

The content of sulfur should be adjusted as low as possible, since this surface-active element impairs the oxidation resistance. Therefore at most 0.010% S is specified.

Molybdenum is limited to at most 2.0%, since this element reduces the oxidation resistance.

Tungsten is limited to at most 2.0%, since this element likewise reduces the oxidation resistance.

For highly corrosive conditions, but especially for a good metal dusting resistance, it is advantageous if the following relationship between Cr and Al is fulfilled:

$$Cr+Al \geq 28 \tag{2a}$$

wherein Cr and Al are the concentrations of the elements in question in mass %. Only then is the content of oxide-forming elements high enough to ensure an adequate metal dusting resistance.

Beyond this, the following relationship must be fulfilled in order that adequate phase stability is assured:

$$Fp \leq 39.9 \text{ with} \tag{3a}$$

$$Fp=Cr+0.272*Fe+2.36*Al+2.22*Si+2.48*Ti+0.374*Mo+0.538*W-11.8*C \tag{4a}$$

wherein Cr, Fe, Al, Si, Ti, Mo, W and C are the concentrations of the elements in question in mass %. The limits for Fp and the possible incorporation of further elements have been justified in detail in the foregoing text.

If necessary, the oxidation resistance may be further improved with additions of oxygen-affine elements. They accomplish this by being incorporated in the oxide layer, where they block the paths of diffusion of oxygen to the grain boundaries.

A minimum content of 0.01% Y is necessary to obtain the effect of the Y that increases the oxidation resistance. For cost reasons, the upper limit is set to 0.20%.

A minimum content of 0.001% La is necessary to obtain the effect of the La that increases the oxidation resistance. For cost reasons, the upper limit is set to 0.20%.

A minimum content of 0.001% Ce is necessary to obtain the effect of the Ce that increases the oxidation resistance. For cost reasons, the upper limit is set to 0.20%.

A minimum content of 0.001% Ce mixed metal is necessary to obtain the effect of the Ce mixed metal that increases the oxidation resistance. For cost reasons, the upper limit is set to 0.20%.

If necessary, Nb may be added, since niobium also increases the high-temperature strength. Higher contents very greatly increase the costs. The upper limit is therefore set at 1.10%.

If necessary, the alloy may also contain tantalum, since tantalum also increases the high-temperature strength. Higher contents very greatly increase the costs. The upper limit is therefore set at 0.60%. A minimum content of 0.001% is necessary in order to achieve an effect.

If necessary, the alloy may also contain Zr. A minimum content of 0.01% Zr is necessary to obtain the effect of Zr that increases the high-temperature strength and the oxidation resistance. For cost reasons, the upper limit is set to 0.20% Zr.

If necessary, Zr may replaced completely or partly by Hf, since this element also, just as Zr, increases the high-temperature strength and the oxidation resistance. The replacement is possible at contents of and above 0.001%. For cost reasons, the upper limit is set to 0.20% Hf.

If necessary, boron may be added to the alloy, since boron improves the creep strength. Therefore a content of at least 0.0001% should be present. At the same time, this surface-active element worsens the oxidation resistance. Therefore at most 0.008% boron is specified.

Cobalt up to 5.0% may be contained in this alloy. Higher contents markedly reduce the oxidation resistance.

Copper is limited to at most 0.5%, since this element reduces the oxidation resistance.

Vanadium is limited to at most 0.5%, since this element reduces the oxidation resistance.

Pb is limited to at most 0.002%, since this element reduces the oxidation resistance. The same is true for Zn and Sn.

Furthermore, optionally the following relationship may be fulfilled for the carbide-forming elements Cr, Ti and C, which describes a particularly good processability:

$$Fa \leq 60 \text{ with} \quad (5a)$$

$$Fa = Cr + 20.4 \cdot Ti + 201 \cdot C \quad (6a)$$

wherein Cr, Ti and C are the concentrations of the elements in question in mass %. The limits for Fa and the possible incorporation of further elements have been justified in detail in the foregoing text.

Furthermore, optionally the following relationship between the elements that increase the strength may be fulfilled, which describes a particularly good high-temperature strength and creep strength:

$$Fk \geq 45 \text{ with} \quad (7a)$$

$$Fk = Cr + 19 \cdot Ti + 10.2 \cdot Al + 12.5 \cdot Si + 98 \cdot C \quad (8a)$$

wherein Cr, Ti, Al, Si and C are the concentrations of the elements in question in mass %. The limits for Fa and the possible incorporation of further elements have been justified in detail in the foregoing text.

DETAILED DESCRIPTION OF PREFERRED EMBODIMENTS

TABLE 1

Alloys according to ASTM B 168-11, all values in mass -%,
[in the table below, all commas should be periods]

| Alloy | Ni | Cr | Co | Mo | Nb | Fe | Mn | Al | C | Cu | Si | S | Ti | P | Zr | Y | B | N | Ce |
|---|---|---|---|---|---|---|---|---|---|---|---|---|---|---|---|---|---|---|---|
| Alloy 600 - N06600 | 72.0 min | 14.0-17.0 | | | | 6.0-10.0 | 1.0 max | | 0.15 max | 0.5 max | 0.5 max | 0.015 max | | | | | | | |
| Alloy 601 - N06601 | 58.0-63.0 | 21.0-25.0 | | | | Rest | 1.0 max | 1.0-1.7 | 0.10 max | 0.5 max | 0.5 max | 0.015 max | | | | | | | |
| Alloy 617 - N06617 | 44.5 min | 20.0-24.0 | 10.0-15.0 | 8.0-10.0 | | 3.0 max | 1.0 max | 0.8-1.5 | 0.05-0.15 | 1.0 max | 0.5 max | 0.015 max | 0.6 max | | | | 0.006 max | | |
| Alloy 690 - N06690 | 58.0 min | 27.0-31.0 | | | | 7.0-11.0 | 0.5 max | | 0.05 max | 0.5 max | 1.0 max | 0.015 max | | | | | | | |
| Alloy 693 - N06693 | Rest | 27.0-31.0 | | | 0.5-2.5 | 2.5-6.0 | 1.0 max | 2.5-4.0 | 0.15 max | 0.5 max | 0.5 max | 0.01 max | 1.0 max | | | | | | |

TABLE 1-continued

Alloys according to ASTM B 168-11, all values in mass -%,
[in the table below, all commas should be periods]

| Alloy | Ni | Cr | Co | Mo | Nb | Fe | Mn | Al | C | Cu | Si | S | Ti | P | Zr | Y | B | N | Ce |
|---|---|---|---|---|---|---|---|---|---|---|---|---|---|---|---|---|---|---|---|
| Alloy 602CA - N06025 | Rest | 24.0-26.0 | | | | 8.0-11.0 | 0.15 max | 1.8-2.4 | 0.15-0.25 | 0.1 max | 0.5 max | 0.010 max | 0.1-0.2 | 0.020 max | 0.01-0.10 | 0.05-0.12 | | | |
| Alloy 45 - N06045 | 45 min | 26.0-29.0 | | | | 21.0-25.0 | 1.0 max | | 0.05-0.12 | 0.3 max | 2.5-3.0 | 0.010 max | | 0.020 max | | | | | 0.03-0.09 |
| Alloy 603 - N06603 | Rest | 24.0-26.0 | | | | 8.0-11.0 | 0.15 max | 2.4-3.0 | 0.20-0.40 | 0.50 max | 0.5 max | 0.010 max | 0.01-0.25 | 0.020 max | 0.01-0.10 | 0.01-0.15 | | | |
| Alloy 696 - N06696 | Rest | 28.0-32.0 | | 1.0-3.0 | | 2.0-6.0 | 1.0 max | | 0.15 max | 1.5-3.0 | 1.0-2.5 | 0.010 max | 1.0 max | | | | | | |

TABLE 2

Typical compositions of some alloys according to ASTM B 168-11 (prior art).
All values in mass-%*). Alloy compositions from U.S. Pat. No. 4,88,125 Table 1
[in the table below, all commas should be periods]

| Alloy | Batch | C | S | Cr | Ni | Mn | Si | Mo | Ti | Nb |
|---|---|---|---|---|---|---|---|---|---|---|
| Alloy 600 N06600 | 164310 | 0.07 | 0.002 | 15.75 | 73.77 | 0.28 | 0.32 | | 0.2 | |
| Alloy 601 N06601 | 156656 | 0.053 | 0.0016 | 22.95 | 59.58 | 0.72 | 0.24 | | 0.47 | |
| Alloy 690 N06690 | 111389 | 0.022 | 0.002 | 28.45 | 61.95 | 0.12 | 0.32 | | 0.29 | |
| Alloy 693 N06693 | Alloy 10 *) | 0.015 | ≤0.01 | 29.42 | 60.55 | 0.014 | 0.075 | | 0.02 | 1.04 |
| Alloy 693 N06693 | Alloy 8 *) | 0.007 | ≤0.01 | 30.00 | 60.34 | 0.11 | 0.38 | | 0.23 | 1.13 |
| Alloy 693 N06693 | Alloy 3 *) | 0.009 | ≤0.01 | 30.02 | 57.79 | 0.01 | 0.14 | | 0.02 | 2.04 |
| Alloy 693 N06693 | Alloy 2 *) | 0.006 | ≤0.01 | 30.01 | 60.01 | 0.12 | 0.14 | | 0.01 | 0.54 |
| Alloy 602 N06025 | 163968 | 0.170 | ≤0.01 | 25.39 | 62.12 | 0.07 | 0.07 | | 0.13 | |
| Alloy 603 N06603 | 52475 | 0.225 | 0.002 | 25.20 | 61.6 | 0.09 | 0.03 | | 0.16 | 0.01 |
| Alloy 696 N06696 | UNS Mitte | 0.080 | ≤0.01 | 30.00 | 61.20 | 0.1 | 1.5 | 2 | 0.1 | |

| Alloy | Cu | Fe | P | Al | Zr | Y | B | $T_{s\,BCC}$ in °C. | Cr + Al | Fp |
|---|---|---|---|---|---|---|---|---|---|---|
| Alloy 600 N06600 | 0.01 | 9.42 | 0.009 | 0.16 | | | 0.001 | | 15.9 | 19.1 |
| Alloy 601 N06601 | 0.04 | 14.4 | 0.008 | 1.34 | 0.015 | 0 | 0.001 | 669 | 24.3 | 31.2 |
| Alloy 690 N06690 | 0.01 | 8.45 | 0.005 | 0.31 | | 0 | 0 | 720 | 28.8 | 32.7 |
| Alloy 693 N06693 | 0.03 | 5.57 | | 3.2 | | | 0.002 | 939 | 32.6 | 39.9 |
| Alloy 693 N06693 | 0.03 | 4.63 | | 3.08 | | | 0.002 | 979 | 33.1 | 41.3 |
| Alloy 693 N06693 | 0.03 | 5.57 | | 4.3 | | | 0.002 | 1079 | 34.3 | 44.5 |
| Alloy 693 N06693 | 0.03 | 5.80 | | 3.27 | | | 0.002 | 948 | 33.3 | 40.3 |
| Alloy 602 N06025 | 0.01 | 9.47 | 0.008 | 2.25 | 0.08 | 0.08 | 0.005 | 690 | 27.6 | 31.8 |
| Alloy 603 N06603 | 0.01 | 9.6 | 0.007 | 2.78 | 0.07 | 0.08 | 0.003 | 707 | 28.0 | 32.2 |
| Alloy 696 N06696 | 2 | 3 | | | | | | 792 | 30.0 | 35.1 |

TABLE 3a

Composition of the laboratory batches, Part 1. All values in mass %
(T: alloy according to the prior art, E: alloy according to the invention,
L: melted on the laboratory scale, G: melted on the industrial scale)
[in the table below, all commas should be periods]

| | | Name | Batch | C | N | Cr | Ni | Mn | Si | Mo | Ti |
|---|---|---|---|---|---|---|---|---|---|---|---|
| T | G | Alloy 602 CA | 156817 | 0.171 | 0.036 | 25.2 | 62.1 | 0.06 | 0.07 | 0.01 | 0.17 |
| T | G | Alloy 602 CA | 160483 | 0.172 | 0.025 | 25.7 | 62.0 | 0.06 | 0.05 | 0.02 | 0.14 |
| T | G | Alloy 601 | 156656 | 0.053 | 0.018 | 23.0 | 59.6 | 0.72 | 0.24 | 0.04 | 0.47 |
| T | G | Alloy 690 | 80116 | 0.010 | 0.025 | 27.8 | 62.8 | 0.18 | 0.15 | 0.01 | 0.31 |
| T | G | Alloy 690 | 111389 | 0.022 | 0.024 | 28.5 | 62.0 | 0.12 | 0.32 | <0.01 | 0.29 |
| | L | Cr30Al1La | 2297 | 0.018 | 0.023 | 29.9 | 68.0 | 0.25 | 0.09 | <0.01 | <0.01 |
| | L | Cr30Al1LaT | 2300 | 0.019 | 0.021 | 30.2 | 67.5 | 0.25 | 0.08 | <0.01 | <0.01 |
| | L | Cr30Al1TiLa | 2298 | 0.018 | 0.022 | 29.9 | 67.5 | 0.25 | 0.08 | <0.01 | 0.3 |
| | L | Cr30Al1TiNbLa | 2308 | 0.017 | 0.028 | 30.1 | 67.1 | 0.25 | 0.08 | <0.01 | 0.31 |
| | L | Cr30Al1CLaTi | 2299 | 0.060 | 0.021 | 30.1 | 67.6 | 0.25 | 0.09 | <0.01 | 0.01 |
| | L | Cr30Al1CLa | 2302 | 0.049 | 0.02 | 30.1 | 67.1 | 0.26 | 0.09 | <0.01 | <0.01 |
| E | L | Cr30Al2La | 2301 | 0.015 | 0.021 | 30.2 | 66.6 | 0.25 | 0.08 | <0.01 | <0.01 |
| | L | Cr30Al1Ti | 250060 | 0.017 | 0.027 | 29.6 | 67.9 | 0.24 | 0.11 | <0.01 | 0.31 |
| | L | Cr30Al1Ti | 250063 | 0.017 | 0.024 | 29.9 | 67.4 | 0.25 | 0.10 | <0.01 | 0.31 |
| | L | Cr30Al1TiNb | 250066 | 0.016 | 0.022 | 29.9 | 67.1 | 0.24 | 0.09 | <0.01 | 0.31 |
| | L | Cr30Al1TiNb | 250065 | 0.017 | 0.025 | 30.3 | 67.1 | 0.24 | 0.10 | 0.01 | 0.3 |
| | L | Cr30Al1TiNbZr | 250067 | 0.019 | 0.020 | 29.7 | 67.2 | 0.25 | 0.10 | 0.02 | 0.31 |
| | L | Cr30Al1TiNb | 250068 | 0.017 | 0.024 | 29.8 | 66.6 | 0.25 | 0.09 | 0.01 | 0.31 |
| E | L | Cr28Al2 | 250129 | 0.018 | 0.025 | 28.2 | 68.3 | 0.25 | 0.10 | <0.01 | <0.01 |
| E | L | Cr28Al2Y | 250130 | 0.022 | 0.022 | 28.1 | 68.6 | 0.25 | 0.07 | <0.01 | <0.01 |
| E | L | Cr28Al2YC1 | 250132 | 0.059 | 0.022 | 28.3 | 68.2 | 0.27 | 0.06 | <0.01 | <0.01 |
| E | L | Cr28Al2Nb.5C1 | 250133 | 0.047 | 0.022 | 28.3 | 67.7 | 0.25 | 0.06 | 0.01 | <0.01 |
| E | L | Cr28Al2Nb.5C1 | 250148 | 0.049 | 0.019 | 27.9 | 67.9 | 0.26 | 0.07 | <0.01 | <0.01 |
| E | L | Cr28Al2Nb1C1 | 250134 | 0.048 | 0.026 | 28.2 | 67.1 | 0.26 | 0.09 | 0.02 | <0.01 |
| E | L | Cr28Al2Nb1C1 | 250147 | 0.045 | 0.017 | 28.4 | 67.5 | 0.27 | 0.07 | 0.02 | <0.01 |
| E | L | Cr28Al2Nb1C1Y | 250149 | 0.054 | 0.020 | 27.9 | 67.2 | 0.27 | 0.06 | 0.01 | <0.01 |
| E | L | Cr28Al2TiC1 | 250137 | 0.063 | 0.024 | 28.2 | 67.7 | 0.27 | 0.09 | <0.01 | 0.15 |
| E | L | Cr28Al2TiC1 | 250138 | 0.053 | 0.018 | 28.3 | 68.4 | 0.27 | 0.05 | <0.01 | 0.16 |

| | | Name | Nb | Cu | Fe | Al | W | $T_{s\,BCC}$ in °C. | Cr + Al | Fp |
|---|---|---|---|---|---|---|---|---|---|---|
| T | G | Alloy 602 CA | <0.01 | 0.01 | 9.6 | 2.36 | — | 683 | 27.6 | 31.9 |
| T | G | Alloy 602 CA | 0.01 | 0.01 | 9.4 | 2.17 | — | 683 | 27.8 | 31.8 |
| T | G | Alloy 601 | 0.01 | 0.04 | 14.4 | 1.34 | 0.01 | 669 | 24.3 | 31.2 |
| T | G | Alloy 690 | <0.01 | 0.01 | 8.5 | 0.14 | — | 683 | 27.9 | 31.4 |
| T | G | Alloy 690 | 0.01 | 0.01 | 8.5 | 0.31 | — | 720 | 28.8 | 32.7 |
| | L | Cr30Al1La | <0.01 | <0.01 | 0.56 | 1.04 | <0.01 | 737 | 30.9 | 32.5 |
| | L | Cr30Al1LaT | <0.01 | <0.01 | 0.54 | 1.3 | <0.01 | 737 | 31.5 | 33.3 |
| | L | Cr30Al1TiLa | <0.01 | <0.01 | 0.55 | 1.28 | <0.01 | 759 | 31.2 | 33.8 |
| | L | Cr30Al1TiNbLa | 0.28 | <0.01 | 0.53 | 1.25 | 0.01 | 772 | 31.4 | 34.3 |
| | L | Cr30Al1CLaTi | <0.01 | <0.01 | 0.54 | 1.25 | 0.01 | 730 | 31.3 | 32.7 |
| | L | Cr30Al1CLa | <0.01 | <0.01 | 0.57 | 1.65 | <0.01 | 730 | 31.8 | 33.8 |
| E | L | Cr30Al2La | <0.01 | <0.01 | 0.54 | 2.25 | <0.01 | 809 | 32.4 | 35.6 |
| | L | Cr30Al1Ti | <0.01 | <0.01 | 0.54 | 1.16 | 0.01 | 759 | 30.8 | 33.3 |
| | L | Cr30Al1Ti | <0.01 | <0.01 | 0.53 | 1.39 | <0.01 | 759 | 31.3 | 34.2 |
| | L | Cr30Al1TiNb | 0.31 | <0.01 | 0.50 | 1.42 | 0.01 | 772 | 31.3 | 34.6 |
| | L | Cr30Al1TiNb | 0.31 | <0.01 | 0.05 | 1.41 | 0.01 | 768 | 31.7 | 34.8 |
| | L | Cr30Al1TiNbZr | 0.31 | <0.01 | 0.53 | 1.47 | 0.01 | 776 | 31.1 | 34.4 |
| | L | Cr30Al1TiNb | 0.88 | <0.01 | 0.53 | 1.43 | 0.02 | 799 | 31.2 | 35.2 |
| E | L | Cr28Al2 | <0.01 | 0.01 | 0.57 | 2.51 | <0.01 | 740 | 30.7 | 34.3 |
| E | L | Cr28Al2Y | <0.01 | <0.01 | 0.51 | 2.61 | <0.01 | 766 | 30.7 | 34.3 |
| E | L | Cr28Al2YC1 | 0.01 | 0.02 | 0.60 | 2.61 | 0.02 | 762 | 30.9 | 34.1 |
| E | L | Cr28Al2Nb.5C1 | 0.50 | 0.02 | 0.52 | 2.76 | 0.02 | 800 | 31.1 | 35.2 |
| E | L | Cr28Al2Nb.5C1 | 0.56 | 0.03 | 0.48 | 2.62 | 0.01 | 779 | 30.5 | 34.5 |
| E | L | Cr28Al2Nb1C1 | 1.06 | 0.03 | 0.48 | 2.84 | 0.02 | 830 | 31.1 | 36.1 |
| E | L | Cr28Al2Nb1C1 | 0.90 | 0.02 | 0.43 | 2.15 | 0.02 | 774 | 30.5 | 34.3 |
| E | L | Cr28Al2Nb1C1Y | 1.04 | 0.03 | 0.45 | 2.64 | <0.01 | 800 | 30.6 | 35.1 |
| E | L | Cr28Al2TiC1 | <0.01 | 0.03 | 0.5 | 2.88 | <0.01 | 788 | 31.0 | 34.9 |
| E | L | Cr28Al2TiC1 | <0.01 | 0.03 | 0.45 | 2.62 | 0.01 | 774 | 30.9 | 34.5 |

TABLE 3b

Composition of the laboratory batches, Part 2: All values in mass %
(The following apply for all alloys: Pb: max. 0.002%, Zn: max. 0.002%.
Sn: max. 0.002%) (For significance of T, E, G, L, see Table 3a)
[in the table below, all commas should be periods]

|   |   | Name | Batch | S | P | Mg | Ca | V | Zr | Co |
|---|---|---|---|---|---|---|---|---|---|---|
| T | G | Alloy 602 CA | 156817 | 0.002 | 0.005 | 0.004 | 0.001 | 0.03 | 0.08 | 0.05 |
| T | G | Alloy 602 CA | 160483 | <0.002 | 0.007 | 0.010 | 0.002 | — | 0.09 | 0.04 |
| T | G | Alloy 601 | 156656 | 0.002 | 0.008 | 0.012 | <0.01 | 0.03 | 0.015 | 0.04 |
| T | G | Alloy 690 | 80116 | 0.002 | 0.006 | 0.030 | 0.0009 | — | <0.002 | 0.02 |
| T | G | Alloy 690 | 111389 | 0.002 | 0.005 | <0.001 | 0.0005 | — | — | 0.01 |
|   | L | Cr30Al1La | 2297 | 0.004 | 0.003 | 0.015 | <0.01 | <0.01 | <0.002 | — |
|   | L | Cr30Al1LaT | 2300 | 0.003 | 0.002 | 0.014 | <0.01 | <0.01 | <0.002 | <0.001 |
|   | L | Cr30Al1TiLa | 2298 | 0.004 | 0.002 | 0.016 | <0.01 | <0.01 | <0.002 | <0.001 |
|   | L | Cr30Al1TiNbLa | 2308 | 0.002 | 0.002 | 0.014 | <0.01 | <0.01 | <0.002 | — |
|   | L | Cr30Al1CLaTi | 2299 | 0.003 | 0.002 | 0.015 | <0.01 | <0.01 | <0.002 | <0.001 |
|   | L | Cr30Al1CLa | 2302 | 0.003 | 0.002 | 0.013 | <0.01 | <0.01 | <0.002 | 0.001 |
| E | L | Cr30Al2La | 2301 | 0.003 | 0.002 | 0.015 | <0.01 | <0.01 | <0.002 | <0.001 |
|   | L | Cr30Al1Ti | 250060 | 0.003 | 0.002 | 0.009 | <0.01 | <0.01 | <0.002 | <0.001 |
|   | L | Cr30Al1Ti | 250063 | 0.003 | 0.003 | 0.012 | <0.01 | <0.01 | <0.002 | <0.001 |
|   | L | Cr30Al1TiNb | 250066 | 0.002 | 0.002 | 0.012 | <0.01 | <0.01 | <0.002 | <0.001 |
|   | L | Cr30Al1TiNb | 250065 | 0.002 | 0.002 | 0.012 | <0.01 | <0.01 | <0.002 | <0.001 |
|   | L | Cr30Al1TiNbZr | 250067 | 0.003 | 0.002 | 0.010 | <0.01 | <0.01 | 0.069 | <0.001 |
|   | L | Cr30Al1TiNb | 250068 | 0.002 | <0.002 | 0.010 | <0.01 | <0.01 | <0.002 | <0.001 |
| E | L | Cr28Al2 | 250129 | 0.004 | 0.003 | 0.011 | 0.0002 | <0.01 | <0.002 | — |
| E | L | Cr28Al2Y | 250130 | 0.003 | 0.003 | 0.013 | <0.0002 | <0.01 | <0.002 | — |
| E | L | Cr28Al2YC1 | 250132 | 0.003 | 0.004 | 0.009 | 0.0012 | 0.01 | 0.003 | <0.01 |
| E | L | Cr28Al2Nb.5C1 | 250133 | 0.005 | 0.003 | 0.009 | 0.0012 | <0.01 | 0.004 | 0.01 |
| E | L | Cr28Al2Nb.5C1 | 250148 | 0.004 | 0.004 | 0.010 | 0.0005 | 0.01 | — | <0.01 |
| E | L | Cr28Al2Nb1C1 | 250134 | 0.006 | 0.002 | 0.009 | 0.0009 | <0.01 | 0.006 | 0.01 |
| E | L | Cr28Al2Nb1C1 | 250147 | 0.006 | 0.002 | 0.010 | 0.0005 | <0.01 | 0.01 | 0.01 |
| E | L | Cr28Al2Nb1C1Y | 250149 | 0.004 | 0.005 | 0.013 | <0.0005 | <0.01 | 0.006 | <0.01 |
| E | L | Cr28Al2TiC1 | 250137 | 0.005 | 0.004 | 0.008 | 0.0002 | <0.01 | 0.004 | <0.01 |
| E | L | Cr28Al2TiC1 | 250138 | 0.005 | 0.004 | 0.010 | 0.0002 | <0.01 | 0.003 | 0.01 |

|   |   | Name | Y | La | B | Hf | T | Ce | O |
|---|---|---|---|---|---|---|---|---|---|
| T | G | Alloy 602 CA | 0.060 | — | 0.003 | — | — | — | 0.001 |
| T | G | Alloy 602 CA | 0.070 | — | 0.003 | — | — | — | 0.001 |
| T | G | Alloy 601 | — | — | 0.001 | — | — | — | 0.0001 |
| T | G | Alloy 690 | — | — | 0.002 | — | — | — | 0.0005 |
| T | G | Alloy 690 | — | — | — | — | — | — | 0.001 |
|   | L | Cr30Al1La | <0.001 | 0.062 | <0.001 | <0.001 | <0.005 | 0.001 | 0.0001 |
|   | L | Cr30Al1LaT | <0.001 | 0.051 | <0.001 | <0.001 | <0.005 | 0.001 | 0.0001 |
|   | L | Cr30Al1TiLa | <0.001 | 0.058 | <0.001 | <0.001 | <0.005 | 0.001 | 0.002 |
|   | L | Cr30Al1TiNbLa | <0.001 | 0.093 | <0.001 | <0.001 | <0.005 | 0.001 | 0.002 |
|   | L | Cr30Al1CLaTi | <0.001 | 0.064 | <0.001 | <0.001 | <0.005 | 0.001 | 0.002 |
|   | L | Cr30Al1CLa | <0.001 | 0.057 | <0.001 | <0.001 | <0.005 | 0.001 | 0.0001 |
| E | L | Cr30Al2La | <0.001 | 0.058 | <0.001 | <0.001 | <0.005 | 0.001 | 0.002 |
|   | L | Cr30Al1Ti | <0.001 | <0.001 | <0.001 | <0.001 | <0.005 | <0.001 | 0.003 |
|   | L | Cr30Al1Ti | <0.001 | <0.001 | <0.001 | <0.001 | <0.005 | <0.001 | 0.003 |
|   | L | Cr30Al1TiNb | <0.001 | <0.001 | <0.001 | <0.001 | <0.005 | <0.001 | 0.004 |
|   | L | Cr30Al1TiNb | <0.001 | <0.001 | <0.001 | <0.001 | <0.005 | <0.001 | 0.005 |
|   | L | Cr30Al1TiNbZr | <0.001 | <0.001 | <0.001 | <0.001 | <0.005 | <0.001 | 0.003 |
|   | L | Cr30Al1TiNb | <0.001 | <0.001 | <0.001 | <0.001 | <0.005 | <0.001 | 0.004 |
| E | L | Cr28Al2 | — | — | <0.0005 | — | — | — | 0.001 |
| E | L | Cr28Al2Y | 0.063 | — | <0.0005 | — | — | — | 0.001 |
| E | L | Cr28Al2YC1 | 0.07 | — | 0.001 | — | — | — | 0.001 |
| E | L | Cr28Al2Nb.5C1 | 0.01 | — | — | — | — | — | 0.001 |
| E | L | Cr28Al2Nb.5C1 | <0.01 | — | — | — | — | — | 0.003 |
| E | L | Cr28Al2Nb1C1 | 0.01 | — | <0.0005 | — | — | — | 0.003 |
| E | L | Cr28Al2Nb1C1 | 0.01 | — | 0.0012 | — | — | — | 0.001 |
| E | L | Cr28Al2Nb1C1Y | 0.08 | — | 0.0012 | — | — | — | 0.002 |
| E | L | Cr28Al2TiC1 | <0.01 | — | 0.0012 | — | — | — | 0.001 |
| E | L | Cr28Al2TiC1 | <0.01 | — | 0.0012 | — | — | — | 0.004 |

TABLE 4

Results of the tension tests at room temperature (RT), 600° C. and 800° C.
The forming speed was $8.33 \cdot 10^{-5}$ sec$^{-1}$ (0.5%/min) for $R_{p0.2}$
and $8.33 \cdot 10^{-4}$ sec$^{-1}$ (5%/min) for $R_m$; KG = grain size.
[in the table below, all commas should be periods]

|   | Name | Batch | Grain size in μm | $R_{p02}$ in MPa RT | $R_m$ in MPa RT | $A_5$ in % RT | $R_{p02}$ in MPa 600° C. | $R_m$ in MPa 600° C. | $A_5$ in % 600° C. | $R_{p02}$ in MPa 800° C. | $R_m$ in MPa 800° C. | Fa | Fk |
|---|---|---|---|---|---|---|---|---|---|---|---|---|---|
| T | Alloy 602 CA | 156817 | 76 | 292 | 699 | 36 | 256 | 578 | 41 | 186 | 198 | 63.0 | 76.9 |
| T | Alloy 602 CA | 160483 | 76 | 340 | 721 | 42 | 254 | 699 | 69 | 186 | 197 | 62.2 | 79.6 |
| T | Alloy601 | 156656 | 136 | 238 | 645 | 53 | 154 | 509 | 54 | 133 | 136 | 43.3 | 56.3 |
| T | Aloy 690 | 80116 | 92 | 279 | 641 | 56 | 195 | 469 | 48 | 135 | 154 | 36.2 | 41.6 |
| T | Alloy 690 | 111389 | 72 | 285 | 630 | 50 | 188 | 465 | 51 |  |  | 36.8 | 43.6 |
|   | Cr30Al1La | 2297 | 233 | 221 | 637 | 67 | 131 | 460 | 61 | 134 | 167 | 33.5 | 43.4 |
|   | Cr30Al1LaT | 2300 | 205 | 229 | 650 | 71 | 131 | 469 | 65 | 132 | 160 | 33.9 | 46.3 |
|   | Cr30Al1TiLa | 2298 | 94 | 351 | 704 | 59 | 228 | 490 | 31 | 149 | 161 | 39.7 | 51.5 |
|   | Cr30Al1TiNbLa | 2308 | 90 | 288 | 683 | 55 | 200 | 508 | 39 | 174 | 181 | 41.6 | 61.0 |
|   | Cr30Al1CLaTi | 2299 | 253 | 258 | 661 | 62 | 212 | 475 | 59 | 181 | 185 | 42.3 | 50.0 |
|   | Cr30Al1CLa | 2302 | 212 | 353 | 673 | 59 | 233 | 480 | 59 | 189 | 194 | 40.0 | 52.9 |
| E | Cr30Al2La | 2301 | 155 | 375 | 716 | 66 | 298 | 504 | 49 | 275 | 277 | 33.2 | 55.6 |
|   | Cr30Al1Ti | 250060 | 114 | 252 | 662 | 67 | 183 | 509 | 62 | 143 | 154 | 39.3 | 50.4 |
|   | Cr30Al1Ti | 250063 | 118 | 252 | 659 | 70 | 178 | 510 | 57 | 148 | 152 | 39.6 | 52.9 |
|   | Cr30Al1TiNb | 250066 | 121 | 240 | 666 | 67 | 186 | 498 | 66 | 245 | 255 | 41.4 | 63.6 |
|   | Cr30Al1TiNb | 250065 | 132 | 285 | 685 | 61 | 213 | 521 | 58 | 264 | 265 | 41.8 | 64.0 |
|   | Cr30Al1TiNbZr | 250067 | 112 | 287 | 692 | 67 | 227 | 532 | 65 | 280 | 280 | 41.6 | 64.2 |
|   | Cr30Al1TiNb | 250068 | 174 | 261 | 666 | 69 | 205 | 498 | 65 | 297 | 336 | 44.9 | 83.2 |
| E | Cr28Al2 | 250129 | 269 | 334 | 674 | 66 |  |  |  | 191 | 224 | 31.8 | 56.8 |
| E | Cr28Al2Y | 250130 | 167 | 322 | 693 | 63 | 252 | 522 | 53 | 220 | 244 | 32.6 | 57.9 |
| E | Cr28Al2YC1 | 250132 | 189 | 301 | 669 | 65 |  |  |  | 226 | 226 | 40.2 | 64.0 |
| E | Cr28Al2Nb.5C1 | 250133 | 351 | 399 | 725 | 57 | 334 | 522 | 33 | 285 | 353 | 40.8 | 78.9 |
| E | Cr28Al2Nb.5C1 | 250148 | 365 | 353 | 704 | 60 | 284 | 523 | 58 | 259 | 344 | 41.2 | 79.5 |
| E | Cr28Al2Nb1C1 | 250134 | 384 | 448 | 794 | 59 | 410 | 579 | 28 | 343 | 377 | 44.4 | 99.4 |
| E | Cr28Al2Nb1C1 | 250147 | 350 | 372 | 731 | 57 | 306 | 547 | 49 | 309 | 384 | 43.0 | 89.1 |
| E | Cr28Al2Nb1C1Y | 250149 | 298 | 415 | 784 | 53 | 339 | 528 | 27 | 340 | 400 | 45.1 | 99.2 |
| E | Cr28Al2TiC1 | 250137 | 142 | 379 | 745 | 59 | 327 | 542 | 29 | 311 | 314 | 44.0 | 70.4 |
| E | Cr28Al2TiC1 | 250138 | 224 | 348 | 705 | 61 | 278 | 510 | 46 | 247 | 296 | 42.2 | 66.5 |

TABLE 5

Results of the oxidation tests at 1000° C. in air after 1056 hours.
[in the table below, all commas should be periods]

| | Name | Batch | Test No. | $m_{gross}$ in g/m² | $m_{net}$ in g/m² | $m_{spall}$ in g/m² |
|---|---|---|---|---|---|---|
| T | Alloy 602 CA | 160483 | 412 | 8.66 | 7.83 | 0.82 |
| T | Alloy 602 CA | 160483 | 425 | 5.48 | 5.65 | −0.18 |
| T | Alloy 601 | 156125 | 403 | 51.47 | 38.73 | 12.74 |
| T | Alloy 690 | 111389 | 412 | 23.61 | 7.02 | 16.59 |
| T | Alloy 690 | 111389 | 421 | 30.44 | −5.70 | 36.14 |
| T | Alloy 690 | 111389 | 425 | 28.41 | −0.68 | 29.09 |
| | Cr30Al1La | 2297 | 412 | 36.08 | −7.25 | 43.33 |
| | Cr30Al1LaT | 2300 | 412 | 41.38 | −2.48 | 43.86 |
| | Cr30Al1TiLa | 2298 | 412 | 49.02 | −30.59 | 79.61 |
| | Cr30Al1TiNbLa | 2306 | 412 | 40.43 | 16.23 | 24.20 |
| | Cr30Al1CLaTi | 2308 | 412 | 42.93 | −15.54 | 58.47 |
| | Cr30Al1CLa | 2299 | 412 | 30.51 | 0.08 | 30.44 |
| | Cr30Al2La | 2302 | 412 | 27.25 | 9.57 | 17.68 |
| E | Cr30Al1Ti | 2301 | 412 | 8.43 | 6.74 | 1.69 |
| | Cr30Al1Ti | 250060 | 421 | 43.30 | −19.88 | 63.17 |
| | Cr30Al1TiNb | 250063 | 421 | 32.81 | −22.15 | 54.96 |
| | Cr30Al1TiNb | 250066 | 421 | 26.93 | −16.35 | 43.28 |
| | Cr30Al1TiNbZr | 250065 | 421 | 25.85 | −24.27 | 50.12 |
| | Cr30Al1TiNb | 250067 | 421 | 41.59 | −15.56 | 57.16 |
| | Cr28Al2 | 250068 | 421 | 42.69 | −39.26 | 81.95 |
| E | Cr28Al2Y | 250129 | 425 | 3.72 | 3.55 | 0.16 |
| E | Cr28Al2YC1 | 250130 | 425 | 4.68 | 4.90 | −0.23 |
| E | Cr28Al2Nb.5C1 | 250132 | 425 | 3.94 | 5.01 | −1.07 |
| E | Cr28Al2Nb.5C1 | 250133 | 425 | 2.56 | 3.98 | −1.42 |
| E | Cr28Al2Nb1C1 | 250148 | 425 | 3.15 | 3.21 | −0.07 |
| E | Cr28Al2Nb1C1 | 250134 | 425 | 3.34 | 4.23 | −0.89 |
| E | Cr28Al2Nb1C1Y | 250147 | 425 | 2.72 | 2.62 | 0.10 |
| E | Cr28Al2TiC1 | 250149 | 425 | 3.44 | 3.84 | −0.40 |
| E | Cr28Al2TiC1 | 250137 | 425 | 3.62 | 4.24 | −0.62 |
| E | Cr30Al1La | 250138 | 425 | 3.87 | 4.28 | −0.41 |

The invention claimed is:

1. A powder for additive fabrication comprising a nickel-chromium alloy, wherein the powder comprises spherical particles having a size of 5 to 250 μm, and wherein the alloy comprises (in wt %) 24 to 33% chromium, 1.8 to 4.0% aluminum, 0.10 to 7.0% iron, 0.001 to 0.50% silicon, 0.005 to 2.0% manganese, 0.00 to 0.60% titanium, respectively 0.0 to 0.05% magnesium and/or calcium, 0.005 to 0.12% carbon, 0.001 to 0.050% nitrogen, 0.00001-0.100% oxygen, 0.001 to 0.030% phosphorus, max. 0.010% sulfur, max. 2.0% molybdenum, max. 2.0% tungsten, the rest nickel and the usual process-related impurities, wherein the powder has total inclusions of 0.04% pore area for a pore size >1 μm.

2. The powder according to claim 1, wherein the powder was manufactured by means of a vacuum inert-gas atomization system (VIGA).

3. The powder according to claim 1, with a chromium content of 24 to <32%.

4. The powder according to claim 1, with an yttrium content of 0.0 to 0.20%.

5. The powder according to claim 1, with a lanthanum content of 0.0 to 0.20%.

6. The powder according to claim 1, with a cerium content of 0.0 to 0.20%.

7. The powder according to claim 1, with a niobium content of 0.0 to 1.1%.

8. The powder according to claim 1, with a zirconium content of 0.0 to 0.20%.

9. The powder according to claim 1, with a boron content of 0.0001 to 0.008%.

10. The powder according to claim 1, further containing 0.0 to 5.0% cobalt.

11. The powder according to claim 1, further containing at most 0.5% copper.

12. The powder according to claim 1, wherein the impurities are adjusted in contents of at most 0.002% Pb, at most 0.002% Zn, at most 0.002% Sn.

13. The powder according to claim 1, wherein the particles have a size of 5-150 μm, especially 10-150 μm.

14. The powder according to claim 1, wherein the powder has a bulk density of 2 up to the density of the alloy of at most 8 g/cm³.

15. The powder according to claim 1, wherein the following relationship must be fulfilled:

$$Fp \leq 39.9 \text{ with} \tag{3a}$$

$$Fp = Cr + 0.272*Fe + 2.36*Al + 2.22*Si + 2.48*Ti + 0.374*Mo + 0.538*W - 11.8*C \tag{4a}$$

wherein Cr, Fe, Al, Si, Ti, Mo, W and C are the concentrations of the elements in question in mass %.

16. A composition of matter generated by additive fabrication using the powder according to claim 1 comprising a component, a structural part, a layer on a component, or a layer on a structural part.

17. The composition of matter according to claim 16, wherein the component, the structural part, the layer on the component, or the layer on the structural part is configured for use in the petrochemical industry.

18. A furnace using the powder according to claim 1.

* * * * *